(12) United States Patent
Sato

(10) Patent No.: US 7,277,232 B2
(45) Date of Patent: Oct. 2, 2007

(54) ZOOM LENS SYSTEM

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 77 days.

(21) Appl. No.: 11/200,158

(22) Filed: Aug. 10, 2005

(65) Prior Publication Data
US 2006/0007559 A1    Jan. 12, 2006

Related U.S. Application Data

(63) Continuation-in-part of application No. 10/761,406, filed on Jan. 22, 2004, now abandoned.

(30) Foreign Application Priority Data

Jan. 24, 2003 (JP) ............................. 2003-016603
Aug. 13, 2004 (JP) ............................. 2004-236077

(51) Int. Cl.
    *G02B 15/14* (2006.01)
(52) U.S. Cl. ...................... 359/682; 359/685; 359/691
(58) Field of Classification Search ................ 359/682, 359/685, 689, 691
    See application file for complete search history.

(56) References Cited

U.S. PATENT DOCUMENTS 4,838,668 A * 6/1989 Betensky et al. ........... 359/689

| | | |
|---|---|---|
| 5,793,536 A | 8/1998 | Sato ........................... 359/691 |
| 5,831,773 A | 11/1998 | Sato ........................... 359/691 |
| 6,487,024 B2 | 11/2002 | Sato ........................... 359/691 |

FOREIGN PATENT DOCUMENTS

| JP | 55-60911 | 5/1980 |
| JP | 8-334694 | 12/1996 |
| JP | 9-171140 | 6/1997 |
| JP | 2000-2837 | 1/2000 |
| JP | 2002-6214 | 1/2002 |

* cited by examiner

*Primary Examiner*—David N. Spector
(74) *Attorney, Agent, or Firm*—Miles & Stockbridge PC

(57) ABSTRACT

An object is to provide a zoom lens system having compactness of about a normal lens, small number of lens elements, a zoom ratio about 2.9, good productivity, and high optical performance. The system includes, in order from the object, a first lens group with negative power and a second lens group with positive power. Zooming is performed by varying a distance between the first lens group and the second lens group. The first lens group includes at least a negative lens and a positive lens. The second lens group includes a front lens group with positive power and a rear lens group with positive power. The front lens group includes a positive lens and a cemented lens constructed by a positive lens cemented with a negative lens. The rear lens group includes a cemented lens constructed by a negative lens cemented with a positive lens. Given conditions are satisfied.

32 Claims, 24 Drawing Sheets

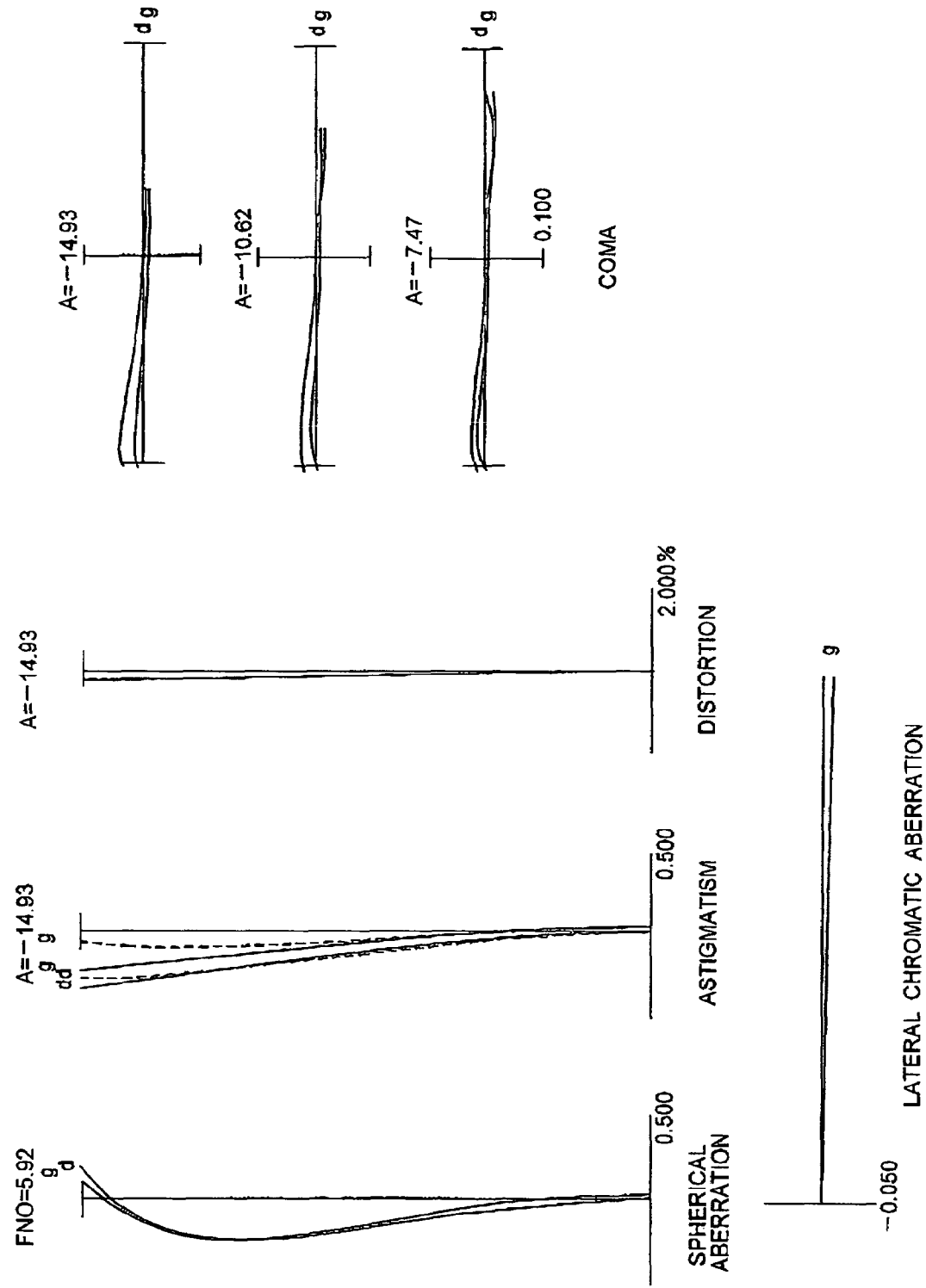

ZOOM LENS SYSTEM

CROSS-REFERENCE TO RELATED APPLICATION

This application is a continuation-in-part of Application No. 10/761,406 filed Jan. 22, 2004 now abandoned.

The disclosures of the following priority applications are herein incorporated by reference:

Japanese Patent Application No. 2003-016603 filed Jan. 24, 2003 and

Japanese Patent Application No. 2004-236077 filed Aug. 13, 2004.

BACKGROUND OF THE INVENTION

1. Field of the Invention

The present invention relates to a zoom lens system.

2. Related Background Art

Among negative-positive type two-group zoom lenses, there is a zoom lens using an advanced Gauss type lens group as a second lens group having positive refractive power (disclosed, for example, in Japanese Patent Application Laid-Open No. 55-60911) In addition, zoom lenses of this type have been disclosed, for example, in Japanese Patent Application Laid-open Nos. 8-334694, 9-171140, 2000-28:37, and 2002-6214).

However, the zoom lens disclosed in Japanese Patent Application Laid-Open No. 55-60931 is bulky and correction of aberration is not satisfactory. The zoom lenses disclosed in Japanese Patent Application Laid-Open Nos. 8-334694 and 2002-6214 have a large number of lens elements and are difficult to be manufactured. Moreover, the zoom lenses disclosed in Japanese Patent Application Laid-Open Nos. 9-171140 and 2000-2837 have a large number of lens elements, so they are bulky.

Accordingly, no zoom lens disclosed in the above-described patent documents can reach a zoom lens system having small number of lens elements, high optical performance and compactness, and being easy to be manufactured.

SUMMARY OF THE INVENTION

The present invention is made in view of the aforementioned problems and has an object to provide a zoom lens system having compactness of about the size of a single focal length normal lens, small number of lens elements, zoom ratio of about 2.9, and high optical performance with being easy to be manufactured.

According to a first aspect of the present invention, a zoom lens system includes, in order from an object, a first lens group having negative refractive power and a second lens group having positive refractive power. Zooming is carried out by varying an air space between the first lens group and the second lens group. The first lens group includes at least, in order from the object, a negative lens and a positive lens. The second lens group includes, in order from the object, a front lens group having positive refractive power and a rear lens group having positive refractive power. The front lens group includes, in order from the object, a positive lens and a cemented lens constructed by a positive lens cemented with a negative lens. The rear lens group includes, in order from the object, a cemented lens constructed by a negative lens cemented with a positive lens. The following conditional expression (1) is satisfied:

$$0.27 \leq Ds/D \leq 0.8 \quad (1)$$

where Ds denotes an air space along the optical axis between the most image side lens surface of the front lens group and the most object side lens surface of the rear lens group, and D denotes a distance along the optical axis between the most object side lens surface and the most image side lens surface of the second lens group.

In one preferred embodiment of the present invention, the following conditional expression (2) is preferably satisfied:

$$0.5 \leq fb/fa \leq 15 \quad (2)$$

where fa denotes the focal length of the front lens group, and fb denotes the focal length of the rear lens group.

In one preferred embodiment of the present invention, the following conditional expression (3) is preferably satisfied:

$$0 < n_{an} - n_{ap} < 0.45 \quad (3)$$

where $n_{ap}$ denotes refractive index of the positive lens of the cemented lens in the front lens group at d-line, and $n_{an}$ denotes refractive index or the negative lens of the cemented lens in the front lens group at d-line.

In one preferred embodiment of the present invention, the following conditional expression (4) is preferably satisfied:

$$0 < n_{bn} - n_{bp} < 0.45 \quad (4)$$

where $n_{bn}$ denotes refractive index of the negative lens of the cemented lens in the rear lens group at d-line, $n_{bp}$ denotes refractive index of the positive lens of the cemented lens in the rear lens group at d-line.

In one preferred embodiment of the present invention, an aperture stop for defining an f-number is arranged between the front lens group and the rear lens group.

In one preferred embodiment of the present invention, the following conditional expression (5) is preferably satisfied:

$$\nu_{1p} < 23.2 \quad (5)$$

where $\nu_{1p}$ denotes Abbe number of the medium of the positive lens in the first lens group.

In one preferred embodiment of the present invention, the following conditional expression (6) is preferably satisfied:

$$1.790 < n_{1p} \quad (6)$$

where $n_{1p}$ denotes refractive index of the medium of the positive lens in the first lens group.

In one preferred embodiment of the present invention, the first lens group consists of, in order from the object, the negative lens and the positive lens. The positive lens has a convex surface facing to the object.

In one preferred embodiment of the present invention, the second lens group preferably includes an aperture stop for defining an f-number arranged in the front lens group or adjacent to the object side of the front lens group.

According to a second aspect of the present invention, a zoom lens system includes, in order from an object, a first lens group having negative refractive power and a second lens group having positive refractive power. Zooming is carried out by varying an air space between the first lens group and the second lens group. The first lens group includes at least, in order from the object, a negative lens and a positive lens. The second lens group includes, in order from the object, a front lens group and a rear lens group. The front lens group includes, in order from the object, a positive lens and a cemented lens constructed by a positive lens cemented with a negative lens. The rear lens group includes, in order from the object, a cemented lens constructed by a negative lens cemented with a positive lens. The following conditional expression (5) is satisfied:

$$v_{1p} < 23.2 \tag{5}$$

where $v_{1p}$ denotes Abbe number of the medium of the positive lens in the first lens group.

According to a third aspect of the present invention, a zoom lens system includes, in order from an object, a first lens group having negative refractive power, and a second lens group having positive refractive power. Zooming is carried out by varying an air space between the first lens group and the second lens group. The first lens group consists of, in order from the object, a negative lens and a positive lens having a convex surface facing to the object. The second lens group includes, in order from the object, a positive lens, a first cemented lens constructed by a positive lens cemented with a negative lens, an aperture stop, a second cemented lens constructed by a negative lens cemented with a positive lens.

According to a fourth aspect of the present invention, a zoom lens system includes, in order from an object, a first lens group having negative refractive power, and a second lens group having positive refractive power. Zooming is carried out by varying an air space between the first lens group and the second lens group. The first lens group consists of, in order from the object, a negative lens and a positive lens having a convex surface facing to the object. The second lens group includes, in order from the object, a positive lens, a first cemented lens constructed by a positive lens cemented with a negative lens, a second cemented lens constructed by a negative lens cemented with a positive lens. An aperture stop is included in the second lens group and arranged in the front lens group $G_{2-1}$ or adjacent to the object side of the front lens group.

Other features and advantages according to the invention will be readily understood from the detailed description of the preferred embodiment in conjunction with the accompanying drawings.

BRIEF DESCRIPTION OF THE DRAWINGS

FIG. 24 graphically shows various aberrations of the zoom lens system according to Example 6 in a telephoto end state when the zoom lens is focused at infinity.

DESCRIPTION OF THE MOST PREFERRED EMBODIMENTS

First Embodiment

Figure 1:
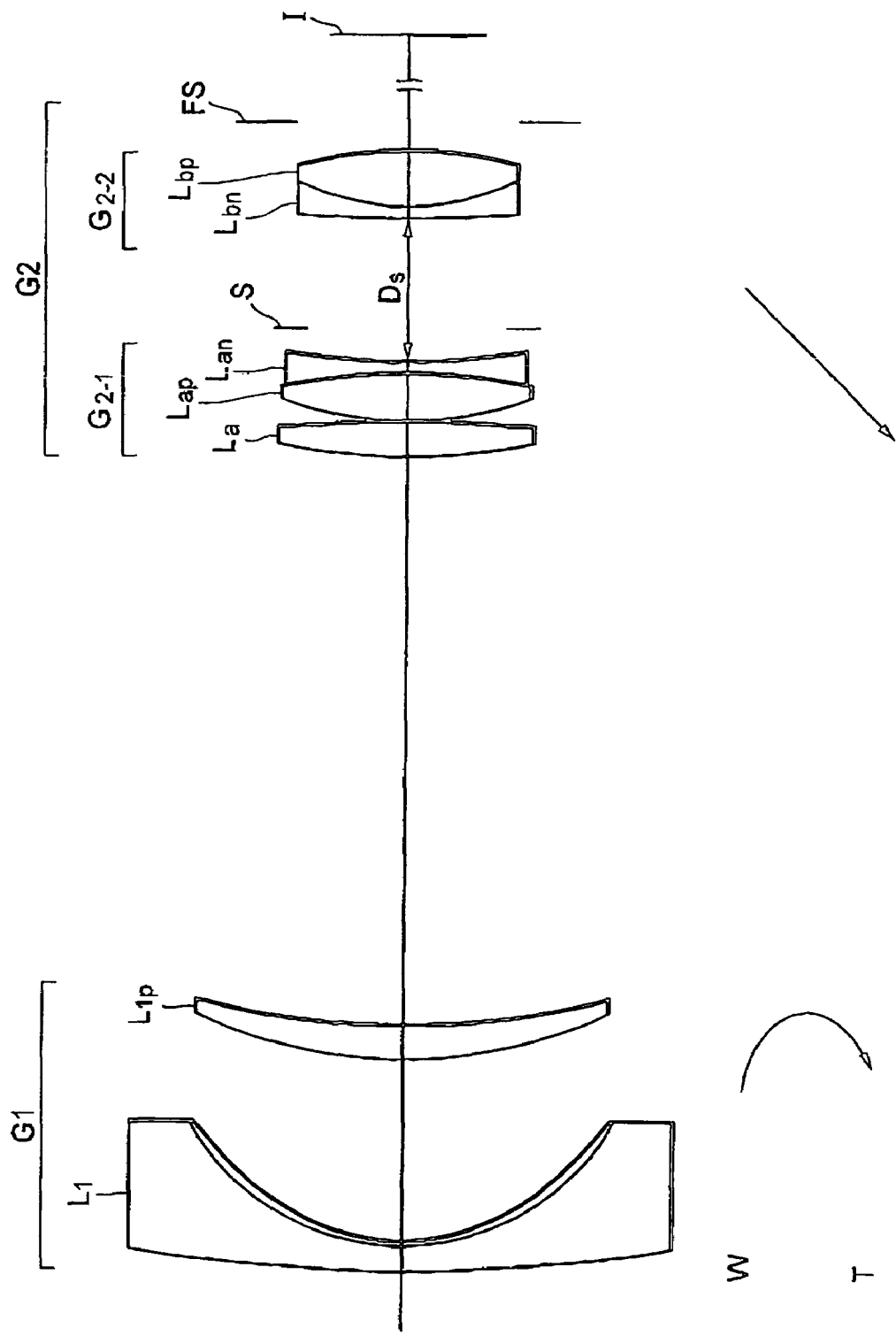
FIG. 1 is a diagram showing the lens arrangement of a zoom lens system according to Example 1 of a first embodiment of the present invention together with movement of each lens group.

Basic construction of the zoom lens according to the present invention is going to be explained below.

Generally, in a negative-positive two-group zoom lens, a second lens group having positive refractive power acts as a master lens of a whole zoom lens system. Usually by the effect of the second lens group, an air space (a necessary minimum air space for varying lens group positions) between the first lens group and the second lens group has to be secured for zooming with securing the back focal length. In consideration of reducing the size and manufacturing cost of the zoom lens system, it becomes further necessary to reduce the size and the number of lens elements of the second lens group as much as possible.

There are such lens types, satisfying these requirements, as an Ernostar type, a modified Triplet type, and a Sonnar type having a basic construction of positive-positive-negative-positive power arrangement. However, the lens having any of these lens types has a large deviation angle upon refracting each light ray at each lens surface, so it has a defect that the sensitivity to decentering is high. In other words, when it is manufactured, accuracy of each part has to be increased upon processing and accuracy of adjustment has to be increased upon assembling, so that it has a defect to increase manufacturing cost.

Therefore, the present invention created a new lens type as a second lens group in a negative-positive two-group type zoom lens. As described later in each Example, the second lens group in a zoom lens system according to the present invention, basically starting from a Gauss type, may include, in order from an object, a front lens group $G_{2-1}$ and a rear lens group $G_{2-2}$. The front lens group $G_{2-1}$ may be composed of, in order from an object, a positive lens, and a cemented lens constructed by a positive lens cemented with a negative lens, and the rear lens group may be composed of a cemented ions constructed by a negative lens cemented with a positive lens. Otherwise, the second lens group may include a front lens group $G_{2-1}$ which is composed of, in order from the object, a positive lens, and a cemented lens constructed by a positive lens cemented with a negative lens, and a rear lens group $G_{2-2}$ which is composed of a cemented lens constructed by a negative lens cemented with a positive lens, and a positive lens.

The second lens group having these constructions has a characteristic of a Gauss type that a negative lens locating at the center of a Triplet type is replaced by a pneumatic lens. Moreover, by widen sufficiently an air space between these two cemented lenses, in other words, a space between the front lens group $G_{2-1}$ and the rear lens group $G_{2-2}$ in the second lens group G2, refractive powers of the front lens group $G_{2-1}$ and the rear lens group $G_{2-2}$ in the second lens group G2 can be lowered. Accordingly, aberrations produced at each lens surface can be suppressed lower, so that not only designed optical performance can be increased but also optical performance after manufacturing can be stable. The configuration of the second lens group G2 makes it possible for the zoom lens system according to the present invention to realize high optical performance, an increase in productivity, lowering manufacturing cost, and compactness.

Then, conditional expressions of a zoom lens system according to the present invention is going to be explained.

In at zoom lens system according to the present invention, the following conditional expression (1) is satisfied:

$$0.27 \leq Ds/D \leq 0.8 \tag{1}$$

where when the second lens group G2 is composed of, in order from the object, a front lens group $G_{2-1}$ having a positive lens and a cemented lens constructed by a positive lens $L_{ap}$ cemented with a negative lens $L_{an}$, and a rear lens group $G_{2-2}$ having a cemented lens constructed by a negative lens $L_{bn}$ cemented with a positive lens $L_{bp}$ and a positive lens, Ds denotes an air space along the optical axis between the most image side lens surface of the front lens group $G_{2-1}$ and the most object side lens surface of the rear lens group $G_{2-2}$, and D denotes a distance along the optical axis between the most object side lens surface and the most image side lens surface of the second lens group G2.

Conditional expression (1) is for bringing the aforementioned effect into full play by the air space between two cemented lenses in the second lens group G2, in other words, the distance between the front lens group $G_{2-1}$ and the rear lens group $G_{2-2}$.

When the ratio Ds/D exceeds the upper limit of conditional expression (1), the ratio of the distance between the front lens group and the rear lens group $G_{2-2}$ to the thickness of the second lens group G2 becomes excessively large, so that the thickness of the front lens group $G_{2-1}$ and the rear lens group $G_{2-2}$ becomes too thin. Accordingly, it becomes difficult to correct aberrations or to accomplish high optical performance, an increase in productivity, lowering manufacturing cost, and compactness. When the upper limit of conditional expression (1) is set to 0.7 or less, more preferably 0.6 or less, further high optical performance, an increase in productivity, lowering manufacturing cost, and compactness can be accomplished.

On the other hand, when the ratio Ds/D falls below the lower limit of conditional expression (1), refractive effect of the pneumatic lens formed between the front lens group $G_{2-1}$ and the rear lens group $G_{2-2}$ cannot be optimized. Accordingly, in order to keep the state of good correction, refractive power of each lens surface of the front lens group $G_{2-1}$ and the rear lens group $G_{2-2}$ becomes strong, so production of aberration increases. Accordingly, it becomes difficult to accomplish high optical performance, an increase in productivity, lowering manufacturing cost, and compactness. In order to correct aberrations preferably, the thickness of each lens element of the front lens group $G_{2-1}$ and the rear lens group $G_{2-2}$ can be thick. However, this is against reduction of production cost, and compactness, so that it is undesirable. In order to bring the effect of the present invention into full play, it is preferable to set the lower limit of conditional expression (1) to 0.33 or more, further preferably to 0.35 or more.

In a zoom lens system according to the present invention, the following conditional expression (2) is preferably satisfied:

$$0.5 \leq fb/fa \leq 15 \tag{2}$$

where fa denotes the focal length of the front lens group $G_{2-1}$ and fb denotes the focal length of the rear lens group $G_{2-2}$.

Conditional expression (2) defines an appropriate range of the ratio of refractive power of the front lens group $G_{2-1}$ to that of the rear lens group: $G_{2-2}$ in the second lens group G2. In the second lens group G2 according to the present invention, it is preferable that difference of refractive power between the front lens group $G_{2-1}$ and the rear lens group $G_{2-2}$ does not become excessively large as is the case of a Gauss type power arrangement. In other words, it is desirable for obtaining high optical performance and in increase in productivity to secure the symmetry of the refractive power arrangement. within the scope of conditional expression (2).

When the ratio fb/fa exceeds the upper limit of conditional expression (2), refractive power of the front lens group $G_{2-1}$ becomes excessively strong relative to that of the rear lens group $G_{2-2}$. Accordingly, the second lens group G2 becomes near to a lens type of an Ernostar that power arrangement is not symmetry. Therefore, each lens element in the front lens group $G_{2-1}$ becomes sensitive to decentering, so that it becomes difficult to accomplish an increase in productivity, a decrease in manufacturing cost and compactness. When the upper limit of conditional expression (2) is set to 10.0 or less, an increase in productivity, lowering manufacturing cost, and compactness can be accomplished. Moreover, when the upper limit of conditional expression (2) set to 7.0 or less, the effect of the present invention brings into full play.

On the other hand, when the ratio fb/fa falls below the lower limit of conditional expression (2), refractive power of the rear lens group $G_{2-2}$ becomes extremely strong relative to that of the front lens group $G_{2-1}$ contrary to the former case. Accordingly, the second lens group becomes near to a lens type that power arrangement is not symmetry. Therefore, each lens element in the rear lens group $G_{2-2}$ becomes sensitive to decentering. Moreover, spherical aberration and upper coma becomes worse, so that it becomes difficult to correct aberrations. Furthermore, the second lens group tends to become large. Accordingly, it becomes difficult to accomplish high optical performance, an increase in productivity, a decrease in manufacturing cost and compactness. When the lower limit of conditional expression (2) is set to 1.0 or more, further high optical performance, an increase in productivity and compactness can be accomplished. Moreover, when the lower limit of conditional expression (2) is set to 1.2 or more, the effect of the present invention brings into full play.

In a zoom lens system according to the present invention, the following conditional expression (3) is preferably satisfied:

$$0 < n_{an} - n_{ap} < 0.45 \quad (3)$$

where $n_{ap}$ denotes refractive index of the positive lens $L_{ap}$ of the cemented lens in the front lens group $G_{2-1}$ at d-line ($\lambda$=587.56 nm), and $n_{an}$ denotes refractive index the negative lens $L_{an}$ of the cemented lens in the front lens group $G_{2-1}$ at d-line ($\lambda$=587.56 nm).

Conditional expression (3) defines an appropriate range of difference of refractive index between the negative lens $L_{an}$ and the positive lens $L_{ap}$ of the cemented lens in the front lens group $G_{2-1}$.

When the value $n_{an} - n_{ap}$ is equal to or exceeds the upper limit of conditional expression (3), refractive index of the positive lens $L_{ap}$ becomes too small, so that the lens have to be thicker to secure the edge thickness of the periphery of the lens. Moreover, it becomes difficult to correct spherical aberration, so it is undesirable. When the upper limit of conditional expression (3) is set to 0.4 or less, it is effective to accomplish high optical performance, compactness, and a small diameter. When the upper limit of conditional expression (3) is set to 0.35 or less, the effect of the present invention brings into full play.

On the other hand, when the value $n_{an} - n_{ap}$ is equal to or falls below the lower limit of conditional expression (3), the magnitude relation of refractive index between the negative lens $L_{an}$ and the positive lens $L_{ap}$ is reversed and refractive index of the negative lens $L_{an}$ becomes smaller than that of the positive lens $L_{ap}$. Accordingly, it becomes difficult for the zoom lens system according to the present invention to set Petzval sum to the optimum value. Therefore, it becomes difficult to correct astigmatism and curvature of field, and as a result, it becomes difficult to make the lens to be wide-angle. When the lower limit of conditional expression (3) is set to 0.1 or more, it is effective to accomplish high optical performance, compactness, and a small diameter. When the lower limit of conditional expression (3) is set to 0.25 or more, the effect of the present invention brings into full play.

In a zoom lens system according to the present invention, the following conditional expression (4) is preferably satisfied:

$$0 < n_{bn} - n_{bp} < 0.45 \quad (4)$$

where $n_{bn}$ denotes refractive index of the negative lens $L_{bn}$ of the cemented lens in the rear lens group $G_{2-2}$ at d-line ($\lambda$=587.56 nm), and $n_{bp}$ denotes refractive index of the positive lens $L_{bp}$ of the cemented lens in the rear lens group $G_{2-2}$ at d-line ($\lambda$=587.56 nm).

Conditional expression (4) defines an appropriate range of difference of refractive index between the negative lens $L_{bn}$ and the positive lens $T_{bp}$ of the cemented lens in the rear lens group $G_{2-2}$.

When the value $n_{bn} - n_{bp}$ is equal to or exceeds the upper limit of conditional expression (4), refractive index of the positive lens $L_{bp}$ becomes too small, so that the lens have to be thicker to secure the edge thickness of the periphery of the lens. Moreover, it becomes difficult to correct spherical aberration, so it is undesirable. When the upper limit of conditional expression (4) is set to 0.4 or less, it is effective to accomplish high optical performance, compactness, and a small diameter. When the upper limit of conditional expression (4) is set to 0.35 or less, the effect of the present invention brings into full play.

On the other hand, when the value $n_{bn} - n_{bp}$ is equal to or falls below the lower limit of conditional expression (4), the magnitude relation of refractive index between the negative lens $L_{bn}$ and the positive lens $L_{bp}$ is reversed and refractive index of the negative lens $L_{bn}$ becomes smaller than that of the positive lens $L_{bp}$. Accordingly, it becomes difficult for the zoom lens system according to the present invention to set Petzval sum to the optimum value. Therefore, it becomes difficult to correct astigmatism and curvature of field, and as a result, it becomes difficult to make the lens to be wide-angle. When the lower limit of conditional expression (4) is set to 0.1 or more, it is effective to accomplish high optical performance, compactness, and a small diameter. When the lower limit of conditional expression (4) is set to 0.25 or more, the effect of the present invention brings into full play.

In a zoom lens system according to the present invention, the aperture stop is preferably arranged between the front lens group $G_{2-1}$ and the rear lens group $G_{2-2}$. By arranging the aperture stop at this position, symmetry of the second lens group relative to the aperture stop can be secured. This is effective for correcting aberrations preferably, so that the effect of the present invention brings into full play.

In a zoom lens system according to the present invention, the following conditional expression (5) is preferably satisfied:

$$\nu_{1p} < 23.2 \quad (5)$$

where $\nu_{1p}$ denotes Abbe number of a positive lens $L_{1p}$ in the first lens group G1.

Conditional expression (5) defines an appropriate range of Abbe number of the positive lens $L_{1p}$ in the first lens group G1. When the number of lens elements is reduced as less as possible like a zoom lens system according to the present invention, it is effective that the positive lens $L_{1p}$ is made of a special glass material that is rarely used. In particular, in order to preferably correct lateral chromatic aberration and axial chromatic aberration in a well-balanced manner up to large angle of view, it is necessary to use extremely high dispersion glass. Accordingly, when conditional expression (5) is not satisfied, a zoom lens system having an extremely few number of lens elements in the first lens group including a wide-angle range with compactness and good productivity cannot be accomplished.

In a zoom lens system according to the present invention, the following conditional expression (6) is preferably satisfied:

$$1.790 < n_{1p} \qquad (6)$$

where $n_{1p}$ denotes refractive index of the positive lens $L_{1p}$ in the first lens group at d-line ($\lambda$=587.56 nm).

Conditional expression (6) defines an appropriate range of refractive index of the positive lens $L_{1p}$ in the first lens group. When the number of lens elements is reduced as less as possible like a zoom lens system according to the present invention, it is necessary that the positive lens $L_{1p}$ is made of a glass material having high refractive index. In particular, in order to preferably correct lower coma and spherical aberration in the telephoto state, it is necessary to use a glass material having extremely high refractive index. Accordingly, when conditional expression (6) is not satisfied, a zoom lens system having an extremely few number of lens elements in the first lens group including a wide-angle range with compactness and good productivity cannot be accomplished.

Numerical examples according to the present invention is explained blow with reference to accompanying drawings.

EXAMPLE 1

FIG. 1 is a diagram showing the lens arrangement of a zoom lens system according to Example 1 of the present invention together with movement of each lens group.

The zoom lens system according to Example 1 is a negative-positive two-group zoom lens system composed of, in order from an object, a first lens group G1 having negative refractive power and a second lens group G2 having positive refractive power.

The first lens group G1 is composed of, in order from the object, a negative meniscus lens $L_1$ having a convex surface facing to the object, and a positive meniscus lens $L_{1p}$ having a convex surface facing to the object. The negative meniscus lens $L_1$ is a compound lens constructed by glass and resin. Resin is arranged on the image side surface of the lens. The image side surface of the resin is an aspherical surface.

The second lens group G2 is composed of, in order from the object, a front lens group $G_{2-1}$, an aperture stop S, a rear lens group $G_{2-2}$, and a fixed stop FS.

The front lens group $G_{2-1}$ is composed of, in order from the object, a double convex positive lens $L_a$, and a cemented negative lens constructed by a double convex positive lens $L_{ap}$ cemented with a double concave negative lens $L_{an}$.

The rear lens group $G_{2-2}$ is composed of, in order from the object, a cemented positive lens constructed by a negative meniscus lens $L_{bn}$ having a convex surface facing to the object cemented with a double convex positive lens $L_{bp}$.

In a zoom lens system according to Example 1 of the present invention, when the state of lens group positions varies from a wide-angle end state (W) to a telephoto end state (T), zooming is carried out by moving the first lens group G1 and the second lens group G2 such that an air space between the first lens group G1 and the second lens group G2 decreases.

In a zoom lens system according to Example 1 of the present invention, focusing to a close object is carried out by moving the first lens group G1 to the object side.

Various values according to Example 1 are shown in Table 1.

In [Specifications], f denotes the focal length, A denotes a half angle of view, and FNO denotes an f-number.

In [Lens Data], the left most column shows the surface number that is a lens surface counted in order from the object, ri denotes the radius of curvature of an i-th lens surface Ri counted in order from the object, di denotes a distance along the optical axis between the lens surfaces Ri and Ri+1, vj denotes Abbe number of the medium between the lens surfaces Ri and Ri+1, and ni denote refractive index of a medium between the lens surfaces Ri and Ri+1 at d-line ($\lambda$=587.56 nm)

In a zoom lens system according to Example 1 of the present invention, an aspherical surface is expressed by the following expression;

$$S(y) = (y^2/R)/[1+(1-\kappa \cdot (y^2/R^2))^{1/2}] + C4 \cdot y^4 + C6 \cdot y^6 + C8 \cdot y^8 + C10 \cdot y^{10}$$

where y denotes a height from the optical axis, S(y) denotes a distance (sag amount) along the optical axis from tangent plane at the vertex of the aspherical surface to the aspherical surface at the height y, R denotes a radius of curvature of a reference sphere (a paraxial radius of curvature), $\kappa$ denotes a conical coefficient, and Cn denote n-th order aspherical coefficient, respectively.

An aspherical surface is denoted by an asterisk (*) attached to the surface number, its paraxial radius of curvature is shown in column "r", and $\kappa$ and each aspherical coefficient are shown in [Aspherical Data].

In [Aspherical Data], "E-n" denotes "$10^{-n}$".

In [Variable Intervals], $\beta$ denotes a magnification of the image relative to the object, 1-Pos denotes wide-angle end state focusing at infinity, 2-Pos denotes intermediate focal length state focusing at infinity, 3-Pos denotes telephoto end state focusing at infinity, 4-Pos denotes wide-angle end state at $\beta$=-0.02500, 5-Pos denotes intermediate focal length state at $\beta$=-0.02500, 6-Pos denotes telephoto end state at $\beta$=-0.02500, 7-Pos denotes wide-angle end state focusing at the closest object, 8-Pos denotes intermediate focal length state focusing at the closest object, and 9-Pos denotes telephoto end state focusing at the closest object.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

TABLE 1

| [Specifications] | | | |
|---|---|---|---|
| f = 18.5-53.4 mm | | | |
| A = 38.3-14.92° | | | |
| FNO = 3.6-5.9 | | | |
| [Lens Data] | | | |
| Surface Number | r | d | v | n |

TABLE 1-continued

| | | | | |
|---|---|---|---|---|
| 1) | 104.6196 | 1.8000 | 49.61 | 1.772500 |
| 2) | 16.5000 | 0.2000 | 38.70 | 1.552230 |
| 3*) | 12.5393 | 12.8848 | | |
| 4) | 30.9426 | 2.5000 | 22.76 | 1.808090 |
| 5) | 53.5711 | D5 | | |
| 6) | 39.6792 | 2.5000 | 55.38 | 1.638540 |
| 7) | −84.1825 | 0.1000 | | |
| 8) | 22.4687 | 3.5000 | 64.10 | 1.516800 |
| 9) | −37.9526 | 0.8000 | 46.58 | 1.804000 |
| 10) | 46.5681 | 2.5000 | | |
| 11> | | 8.0718 | Aperture Stop S | |
| 12) | 104.9126 | 0.8000 | 37.17 | 1.834000 |
| 13) | 15.2108 | 4.0000 | 64.10 | 1.516800 |
| 14) | −26.1886 | 2.0000 | | |
| 15) | | D15 | Fixed Stop FS | |

[Aspherical Data]
Surface Number 3

$\kappa = -0.4789$
$C4 = 4.27070E-05$
$C6 = -7.03220E-08$
$C8 = 1.22200E-10$
$C10 = -2.85230E-13$

[Variable Intervals]

| | 1-POS | 2-POS | 3-POS |
|---|---|---|---|
| f | 18.50000 | 31.50000 | 53.40000 |
| D0 | ∞ | ∞ | ∞ |
| D5 | 41.36450 | 16.06721 | 1.30316 |
| D15 | 38.25595 | 53.11309 | 78.14166 |

| | 4-Pos | 5-Pos | 6-Pos |
|---|---|---|---|
| β | −0.02500 | −0.02500 | −0.02500 |
| D0 | 711.2012 | 1231.2011 | 2107.2011 |
| D5 | 42.70538 | 16.85471 | 1.76770 |
| D15 | 38.25595 | 53.11309 | 78.14166 |

| | 7-POS | 8-POS | 9-POS |
|---|---|---|---|
| β | −0.07295 | −0.11922 | −0.21041 |
| D0 | 224.8104 | 235.4075 | 224.9888 |
| D5 | 45.27701 | 19.82280 | 5.21293 |
| D15 | 38.25595 | 53.11309 | 78.14166 |

[Values for Conditional Expressions]

(1) $Ds/D = 0.436$
(2) $f_b/f_a = 3.28$
(3) $n_{an}-n_{ap} = 0.287$
(4) $n_{bn}-n_{bp} = 0.317$
(5) $\nu_{1p} = 22.8$
(6) $n_{1p} = 1.808$

Figure 2:
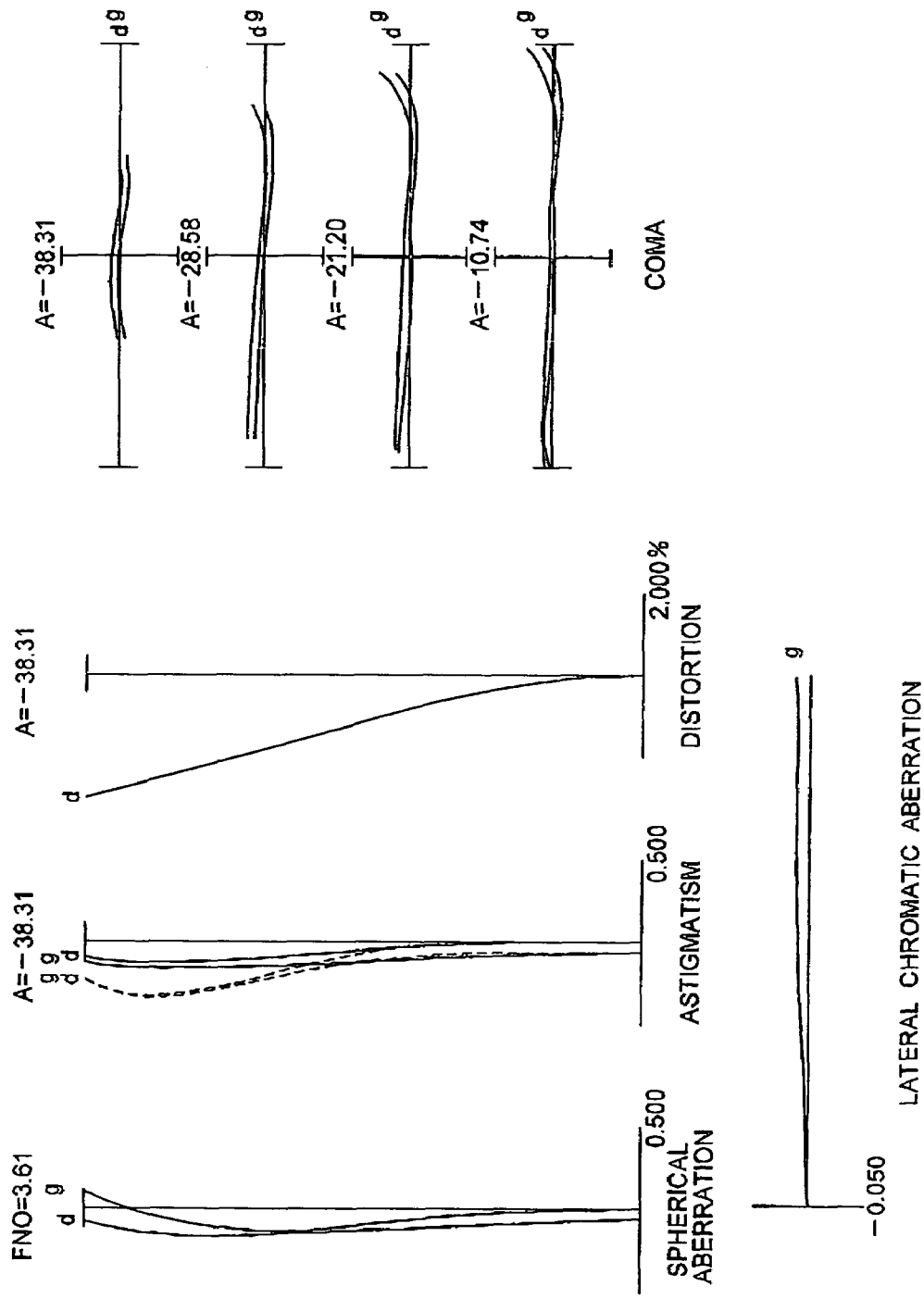
FIG. 2 graphically shows various aberrations of the zoom lens system according to Example 1 in a wide-angle end state when the zoom lens is focused at infinity.
Figure 3:
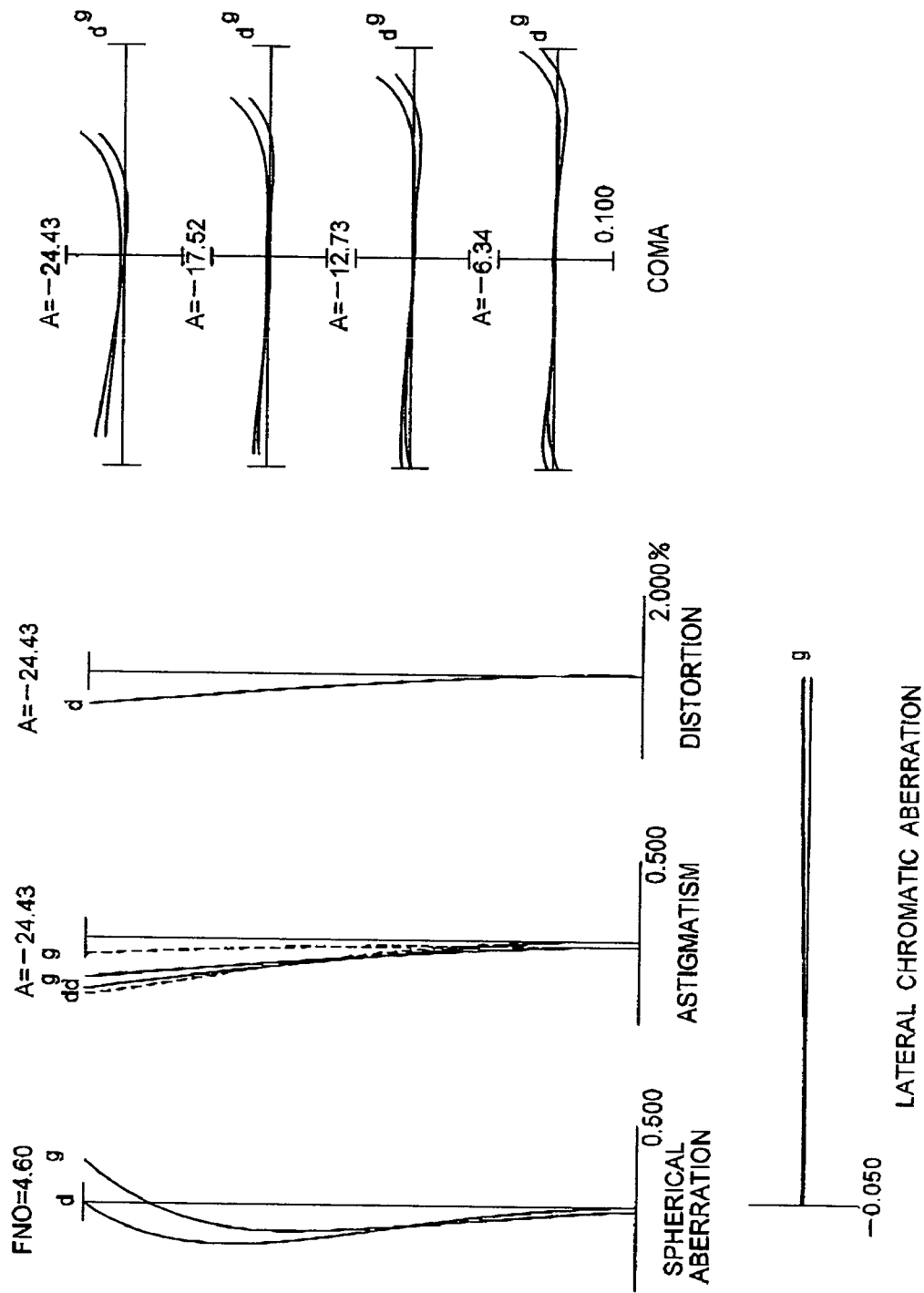
FIG. 3 graphically shows various aberrations of the zoom lens system according to Example 1 in an intermediate focal length state when the zoom lens is focused at infinity.
Figure 4:
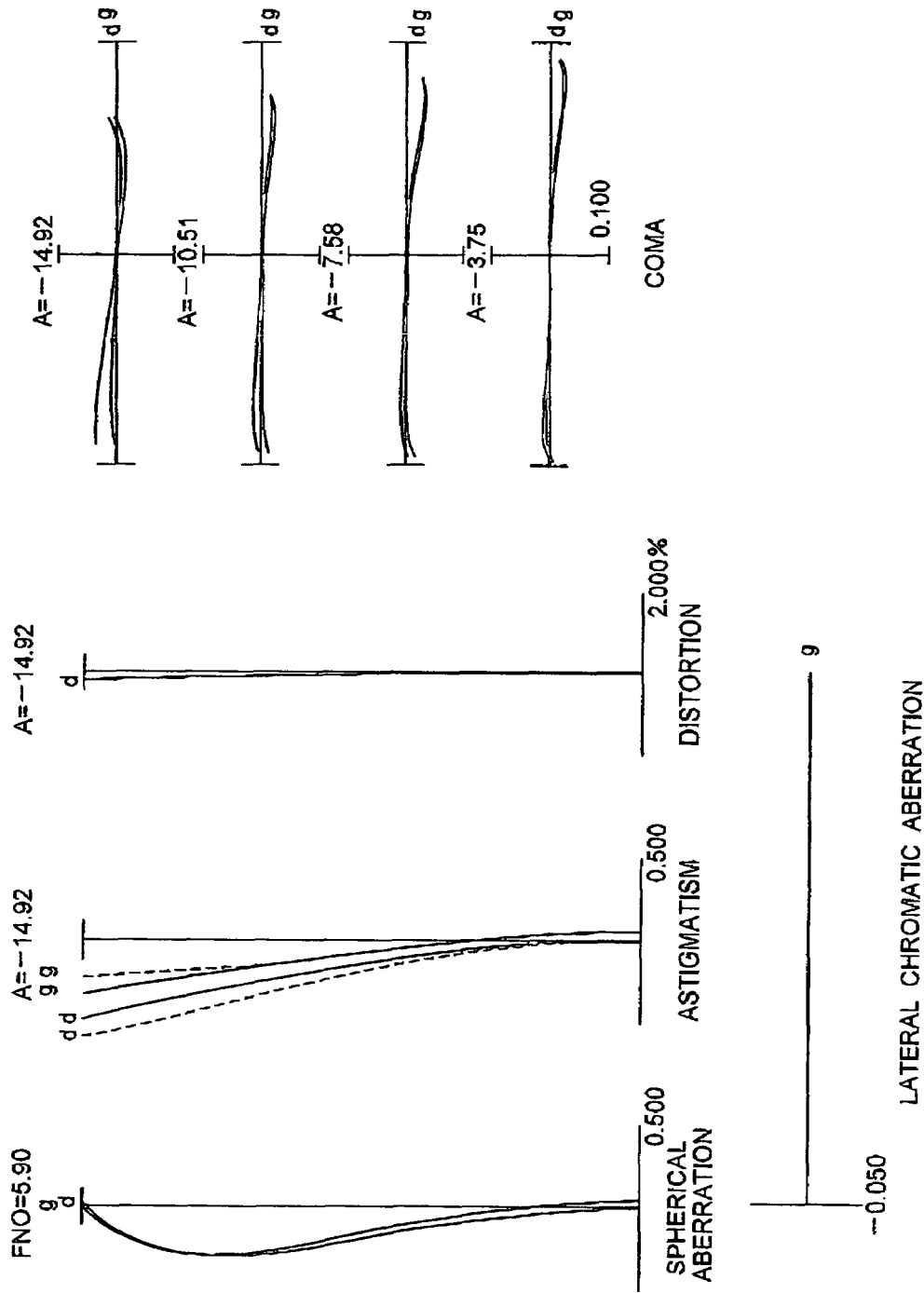
FIG. 4 graphically shows various aberrations of the zoom lens system according to Example 1 in a telephoto end state when the zoom lens is focused at infinity.

FIGS. 2, 3, and 4 graphically show various aberrations of the zoom lens system according to Example 1 in a wide-angle end state, an intermediate focal length state, and a telephoto end state, respectively, when the zoom lens system is focused at infinity.

In respective graphs, FNO denotes the f-number, and A denotes a half angle of view (unit: degree). In the graph showing spherical aberration, f-number shows the value at the maximum aperture. In the graphs showing astigmatism and distortion, the maximum value of a half angle of view A is shown. In the graph showing astigmatism, a solid line indicates a sagittal image plane and a broken line indicates a meridional plane. The above-described explanation regarding various aberration graphs is the same as the other example.

As is apparent from the respective graphs, the zoom lens system according to Example 1 shows superb optical performance as a result of good corrections to various aberrations in each focal length state (the wide-angle end state, the intermediate focal length state, and the telephoto end state).

EXAMPLE 2

Figure 5:
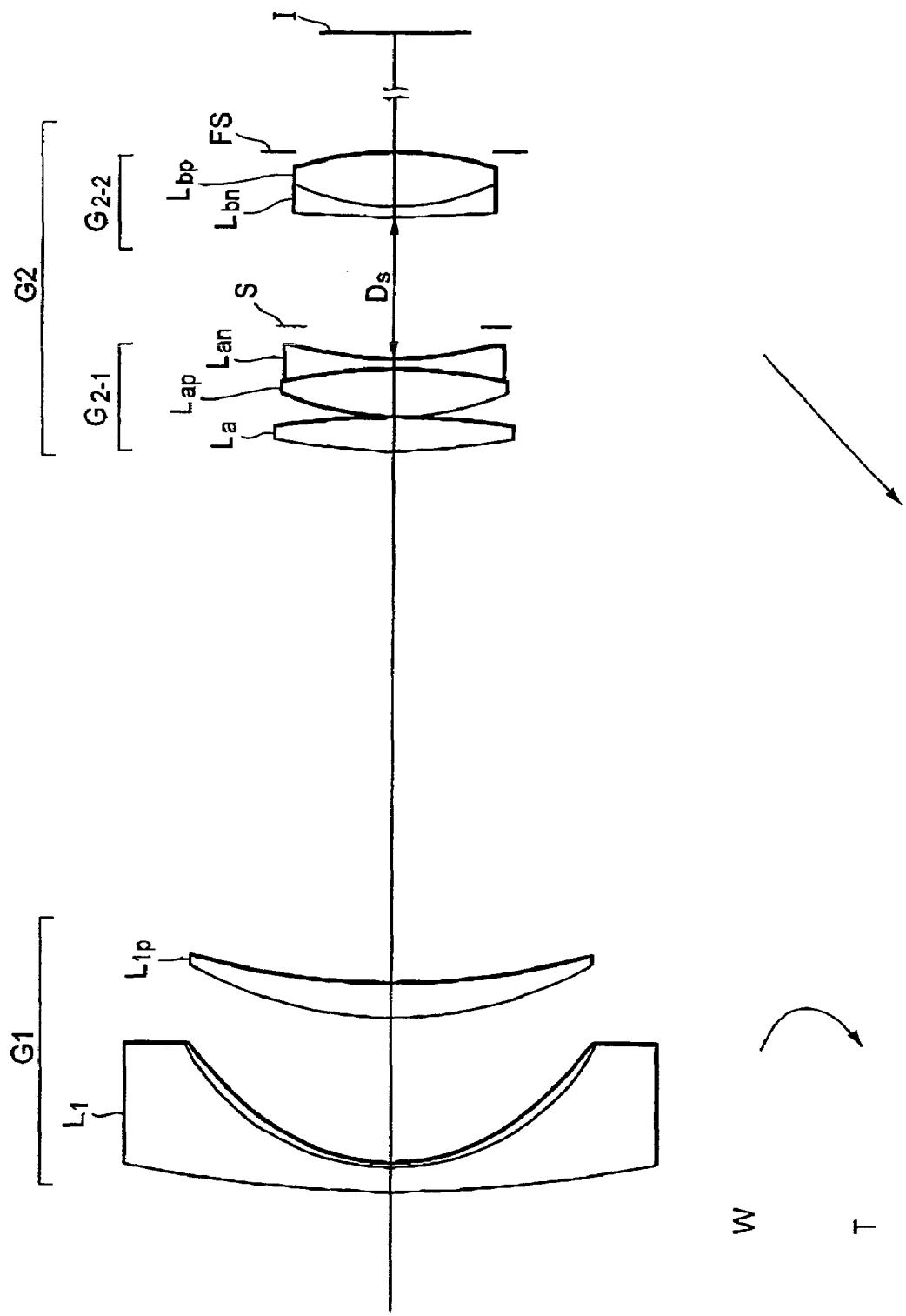
FIG. 5 is a diagram showing the lens arrangement of a zoom lens system according to Example 2 of the first embodiment of the present invention together with movement of each lens group.

FIG. 5 is a diagram showing the lens arrangement of a zoom lens system according to Example 2 of the present invention together with movement of each lens group.

The zoom lens system according to Example 2 is a negative-positive two-group zoom lens system composed of, in order from an object, a first lens group G1 having negative refractive power and a second lens group G2 having positive refractive power.

The first lens group G1 is composed of, in order from the object, a negative meniscus lens $L_1$ having a convex surface facing to the object, and a positive meniscus lens $L_{1p}$ having a convex surface facing to the object. The negative meniscus lens $L_1$ is a compound lens constructed by glass and resin. Resin is arranged on the image side surface of the lens. The image side surface of the resin is an aspherical surface.

The second lens group G2 is composed of, in order from the object, a front lens group $G_{2-1}$, an aperture stop S, a rear lens group $G_{2-2}$, and a fixed stop FS.

The front lens group $G_{2-1}$ is composed of, in order from the object, a double convex positive lens $L_a$, and a cemented negative lens constructed by a double convex positive lens $L_{ap}$ cemented with a double concave negative lens $L_{an}$.

The rear lens group $G_{2-2}$ is composed of, in order from the object, a cemented positive lens constructed by a negative meniscus lens $L_{bn}$ having a convex surface facing to the object cemented with a double convex positive lens $L_{bp}$.

In a zoom lens system according to Example 2 of the present invention, when the state of lens group positions varies from a wide-angle end state (W) to a telephoto end state (T), zooming is carried out by moving the first lens group G1 and the second lens group G2 such that an air space between the first lens group G1 and the second lens group G2 decreases.

In a zoom lens system according to Example 2 of the present invention, focusing to a close object is carried out by moving the first lens group G1 to the object side.

Various values according to Example 2 are shown in Table 2.

TABLE 2

[Specifications]

$f = 18.5-53.4$ mm
$A = 38.3-14.92°$
$FNO = 3.6-5.9$

[Lens Data]

| Surface Number | r | d | ν | n |
|---|---|---|---|---|
| 1) | 86.5539 | 1.8000 | 49.61 | 1.772500 |
| 2) | 16.0000 | 0.2000 | 38.70 | 1.552230 |
| 3*) | 12.1665 | 10.7995 | | |
| 4) | 26.9923 | 2.5000 | 22.76 | 1.808090 |
| 5) | 44.6158 | D5 | | |
| 6) | 38.5505 | 2.5000 | 55.38 | 1.638540 |
| 7) | −55.9183 | 0.1000 | | |
| 8) | 18.6738 | 3.5000 | 64.10 | 1.516800 |
| 9) | −32.6160 | 0.8000 | 46.58 | 1.804000 |
| 10) | 26.8523 | 2.5000 | | |
| 11> | | 8.2839 | Aperture Stop S | |
| 12) | 85.5647 | 0.8000 | 37.17 | 1.834000 |
| 13) | 16.4881 | 4.0000 | 64.10 | 1.516800 |

TABLE 2-continued

| | | | |
|---|---|---|---|
| 14) | −23.7659 | 0.0000 | |
| 15) | | D15 | Fixed Stop FS |

[Aspherical Data]
Surface Number 3

$\kappa = -0.5076$
$C4 = 5.17550E-05$
$C6 = -5.62150E-08$
$C8 = 5.34710E-11$
$C10 = -2.24340E-13$

[Variable Intervals]

| | 1-POS | 2-POS | 3-POS |
|---|---|---|---|
| f | 18.50000 | 31.50000 | 53.40000 |
| D0 | ∞ | ∞ | ∞ |
| D5 | 40.23414 | 15.63955 | 1.28562 |
| D15 | 38.95217 | 53.39662 | 77.72995 |

| | 4-Pos | 5-Pos | 6-Pos |
|---|---|---|---|
| β | −0.02500 | −0.02500 | −0.02500 |
| D0 | 710.5943 | 1230.5943 | 2106.5943 |
| D5 | 41.57502 | 16.42705 | 1.75016 |
| D15 | 38.95217 | 53.39662 | 77.72995 |

| | 7-POS | 8-POS | 9-POS |
|---|---|---|---|
| β | −0.07154 | −0.11715 | −0.20636 |
| D0 | 229.1933 | 239.4904 | 229.366 |
| D5 | 44.07117 | 19.32964 | 5.12007 |
| D15 | 38.95217 | 53.39662 | 77.72995 |

[Values for Conditional Expressions]

(1) $Ds/D = 0.480$
(2) $f_b/f_a = 1.76$
(3) $n_{an}-n_{ap} = 0.287$
(4) $n_{bn}-n_{bp} = 0.317$
(5) $\nu_{lp} = 22.8$
(6) $n_{lp} = 1.808$

Figure 6:
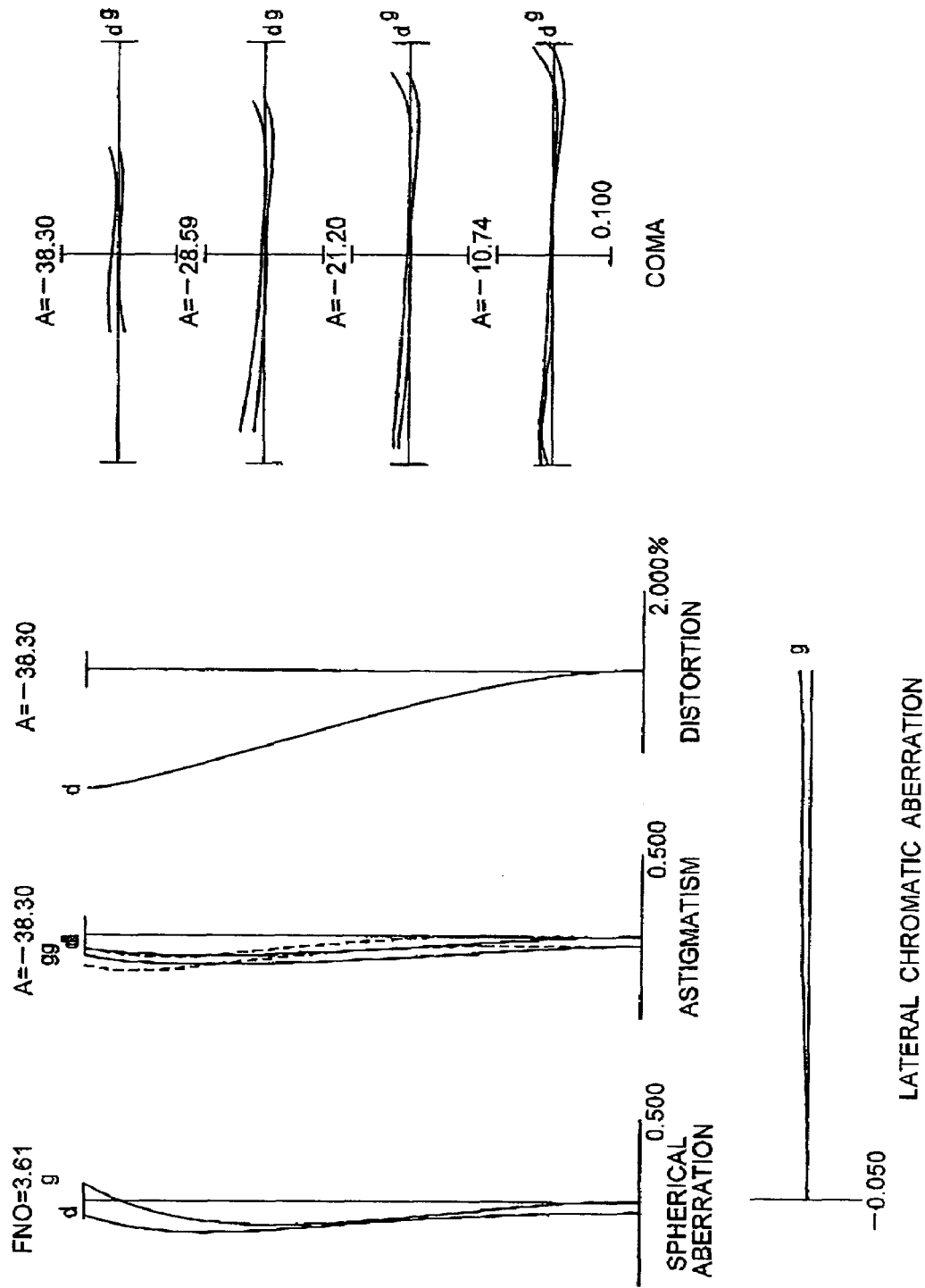
FIG. 6 graphically shows various aberrations of the zoom lens system according to Example 2 in a wide-angle end state when the zoom lens is focused at infinity.
Figure 7:
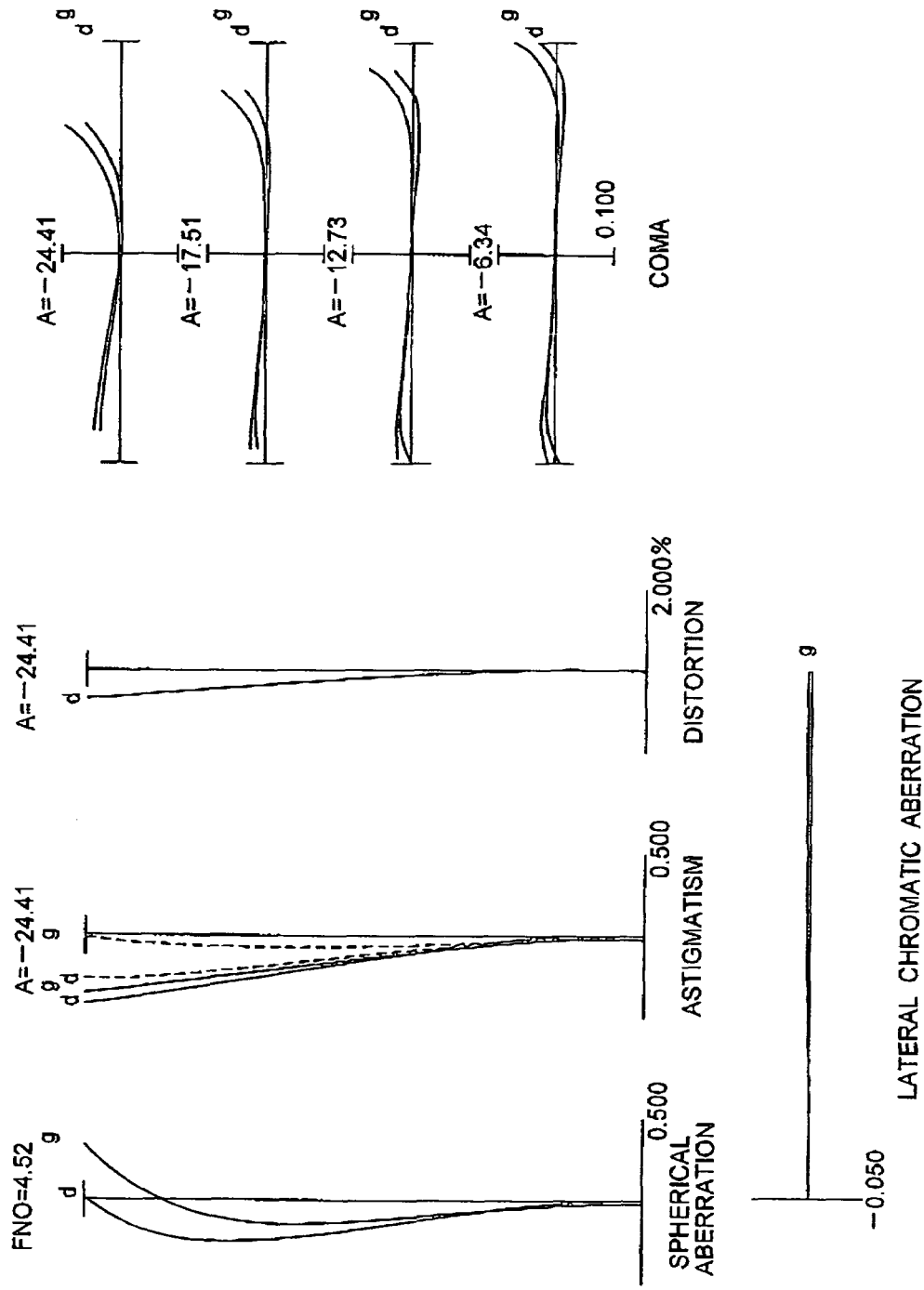
FIG. 7 graphically shows various aberrations of the zoom lens system according to Example 2 in an intermediate local length state when the zoom lens is focused at infinity.
Figure 8:
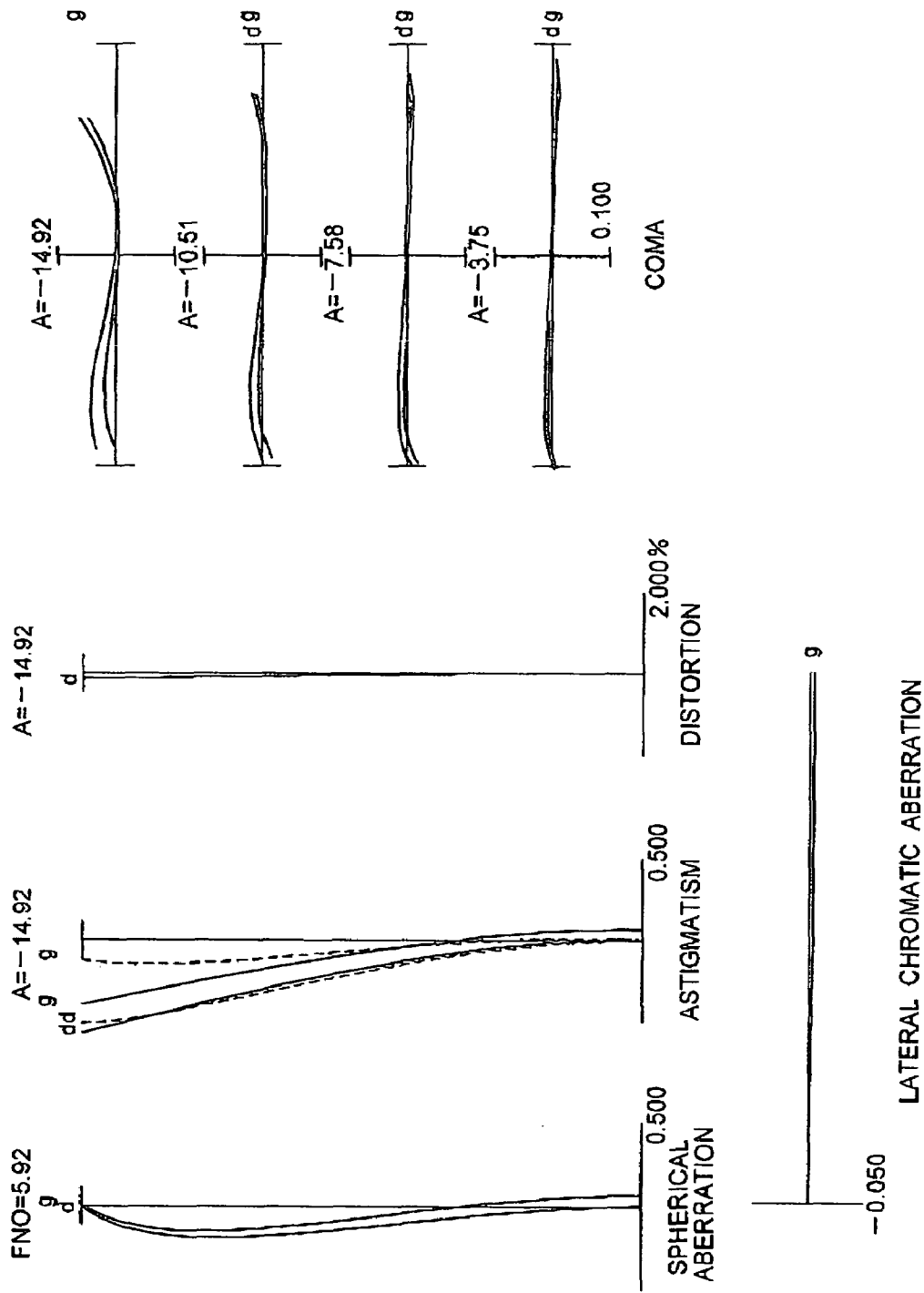
FIG. 8 graphically shows various aberrations of the zoom lens system according to Example 2 in a telephoto end state when the zoom lens is focused at infinity.

FIGS. 6, 7, and 8 graphically show various aberrations of the zoom lens system according to Example 2 in a wide-angle end state, an intermediate focal length state, and a telephoto end state, respectively, when the zoom lens system is focused at infinity.

As is apparent from the respective graphs, the zoom lens system according to Example 2 shows superb optical performance as a result of good corrections to various aberrations in each focal length state (the wide-angle end state, the intermediate focal length state, and the telephoto end state).

EXAMPLE 3

Figure 9:
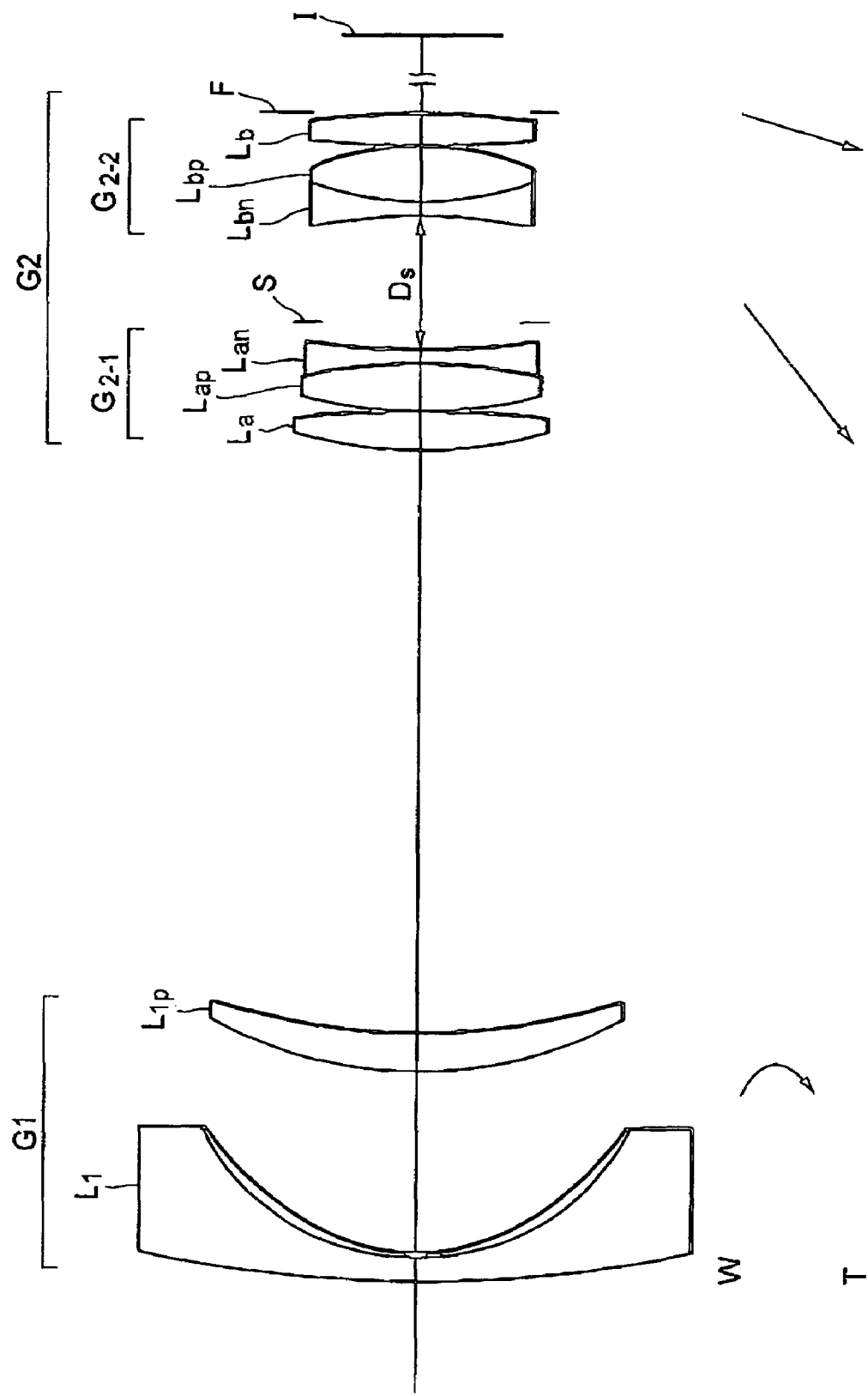
FIG. 9 is a diagram showing the lens arrangement of a zoom lens system according to Example 3 of the first embodiment of the present invention together with movement of each lens group.

FIG. 9 is a diagram showing the lens arrangement of a zoom lens system according to Example 3 of the present invention together with movement of each lens group.

The zoom lens system according to Example 3 is a negative-positive two-group zoom lens system composed of, in order from an object, a first lens group G1 having negative refractive power and a second lens group G2 having positive refractive power.

The first lens group G1 is composed of, in order from the object, a negative meniscus lens $L_1$ having a convex surface facing to the object, and a positive meniscus lens $L_{1p}$ having a convex surface facing to the object. The negative meniscus lens $L_1$ is a compound lens constructed by glass and resin. Resin is arranged on the image side surface of the lens. The image side surface of the resin is an aspherical surface.

The second lens group G2 is composed of, in order from the object, a front lens group $G_{2-1}$, an aperture stop S, a rear lens group $G_{2-2}$, and a flare stopper F.

The front lens group $G_{2-1}$ is composed of, in order from the object, a double convex positive lens $L_a$, and a cemented negative lens constructed by a double convex positive lens $L_{ap}$ cemented with a double concave negative lens $L_{an}$.

The rear lens group $G_{2-2}$ is composed of, in order from the object, a cemented negative lens constructed by a negative meniscus lens $L_{bn}$ having a convex surface facing to the object cemented with a double convex positive lens $L_{bp}$, and a double convex positive lens $L_b$.

In a zoom lens system according to Example 3 of the present invention, when the state of lens group positions varies from a wide-angle end state (W) to a telephoto end state (T), zooming is carried out by moving the first lens group G1 and the second lens group G2 such that an air space between the first lens group G1 and the second lens group G2 decreases.

In a zoom lens system according to Example 3 of the present invention, focusing to a close object is carried out by moving the first lens group G1 to the object side.

The aforementioned flare stopper F has a fixed diameter and moves independently with the second lens group G2 upon zooming.

Various values according to Example 3 are shown in Table 3.

TABLE 3

[Specifications]

$f = 18.5-53.4$ mm
$A = 38.2-14.93°$
$FNO = 3.6-5.9$

[Lens Data]

| Surface Number | r | d | ν | n |
|---|---|---|---|---|
| 1) | 83.0076 | 1.8000 | 49.61 | 1.772500 |
| 2) | 16.5000 | 0.2000 | 38.70 | 1.552230 |
| 3*) | 12.6003 | 13.3087 | | |
| 4) | 28.5874 | 2.8000 | 22.76 | 1.808090 |
| 5) | 43.4120 | D5 | | |
| 6) | 28.4446 | 3.0000 | 55.38 | 1.638540 |
| 7) | −79.3719 | 0.1000 | | |
| 8) | 33.4115 | 3.5000 | 64.10 | 1.516800 |
| 9) | −31.0350 | 1.0000 | 46.58 | 1.804000 |
| 10) | 65.3951 | 2.0000 | | |
| 11> | | 8.0718 | Aperture Stop S | |
| 12) | −28.2267 | 1.0000 | 46.58 | 1.804000 |
| 13) | 21.7458 | 4.2000 | 82.52 | 1.497820 |
| 14) | −17.9528 | 0.1000 | | |
| 15) | 91.5812 | 2.3000 | 70.41 | 1.487490 |
| 16) | −47.8355 | D16 | | |
| 17) | | D17 | Flare Stopper F | |

[Aspherical Data]
Surface Number 3

$\kappa = -0.9766$
$C4 = 7.59690E-05$
$C6 = -1.78000E-07$
$C8 = 4.03250E-10$
$C10 = -5.80270E-13$

[Variable Intervals]

| | 1-POS | 2-POS | 3-POS |
|---|---|---|---|
| f | 18.50000 | 31.43000 | 53.40000 |
| D0 | ∞ | ∞ | ∞ |
| D5 | 43.62877 | 17.01071 | 1.34180 |

TABLE 3-continued

| | | | |
|---|---|---|---|
| D16 | 0.00000 | 6.23924 | 16.84063 |
| D17 | 41.78742 | 51.14628 | 67.04837 |
| | 4-Pos | 5-Pos | 6-Pos |
| β | −0.02500 | −0.02500 | −0.02500 |
| D0 | 710.5710 | 1227.7709 | 2106.5709 |
| D5 | 44.96965 | 17.79996 | 1.80634 |
| D16 | 0.00000 | 6.23924 | 16.84063 |
| D17 | 41.78742 | 51.14628 | 67.04837 |
| | 7-POS | 8-POS | 9-POS |
| β | −0.07502 | −0.12191 | −0.21637 |
| D0 | 217.1797 | 228.3744 | 217.3682 |
| D5 | 47.65235 | 20.85957 | 5.36231 |
| D16 | 0.00000 | 6.23924 | 16.84063 |
| D17 | 41.78742 | 51.14628 | 67.04837 |

[Values for Conditional Expressions]

(1) Ds/D = 0.399
(2) $f_b/f_a$ = 4.17
(3) $n_{an} - n_{ap}$ = 0.287
(4) $n_{bn} - n_{bp}$ = 0.306
(5) $v_{lp}$ = 22.8
(6) $n_{lp}$ = 1.808

Figure 10:
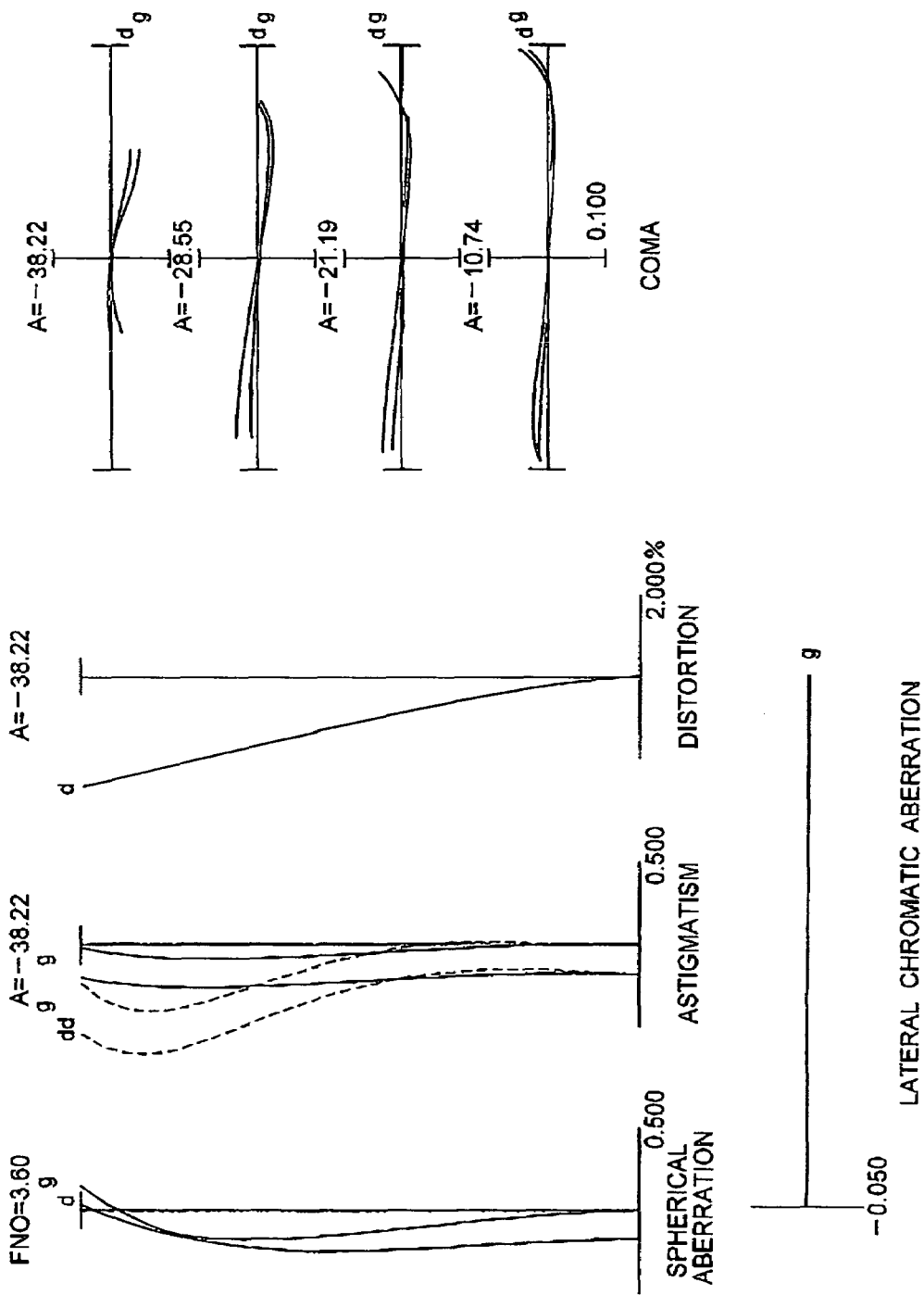
FIG. 10 graphically shows various aberrations of the zoom lens system according to Example 3 in a wide-angle end state when the zoom lens is focused at infinity.
Figure 11:
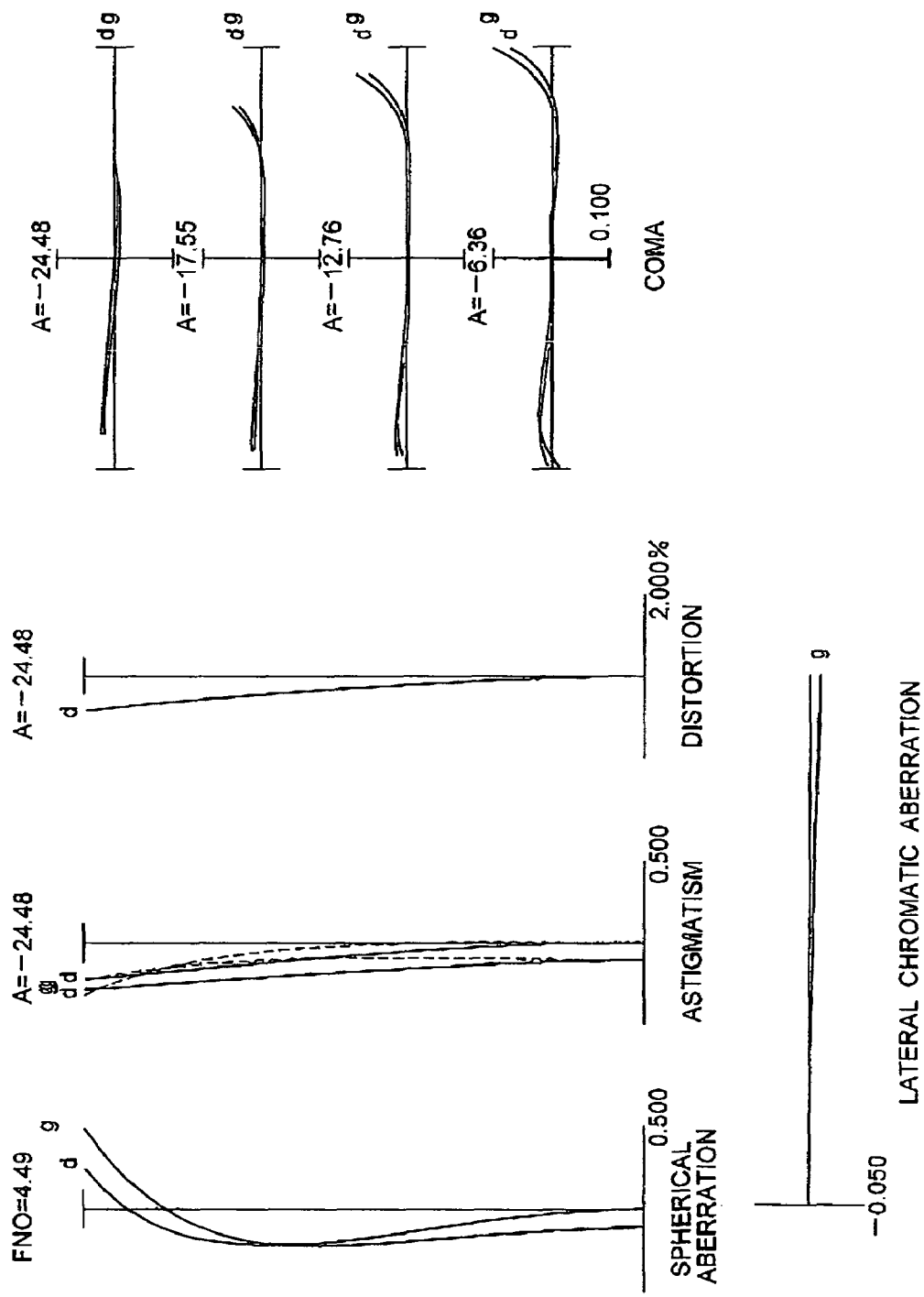
FIG. 11 graphically shows various aberrations of the zoom lens system according to Example 3 in an intermediate focal length state when the zoom lens is focused at infinity.
Figure 12:
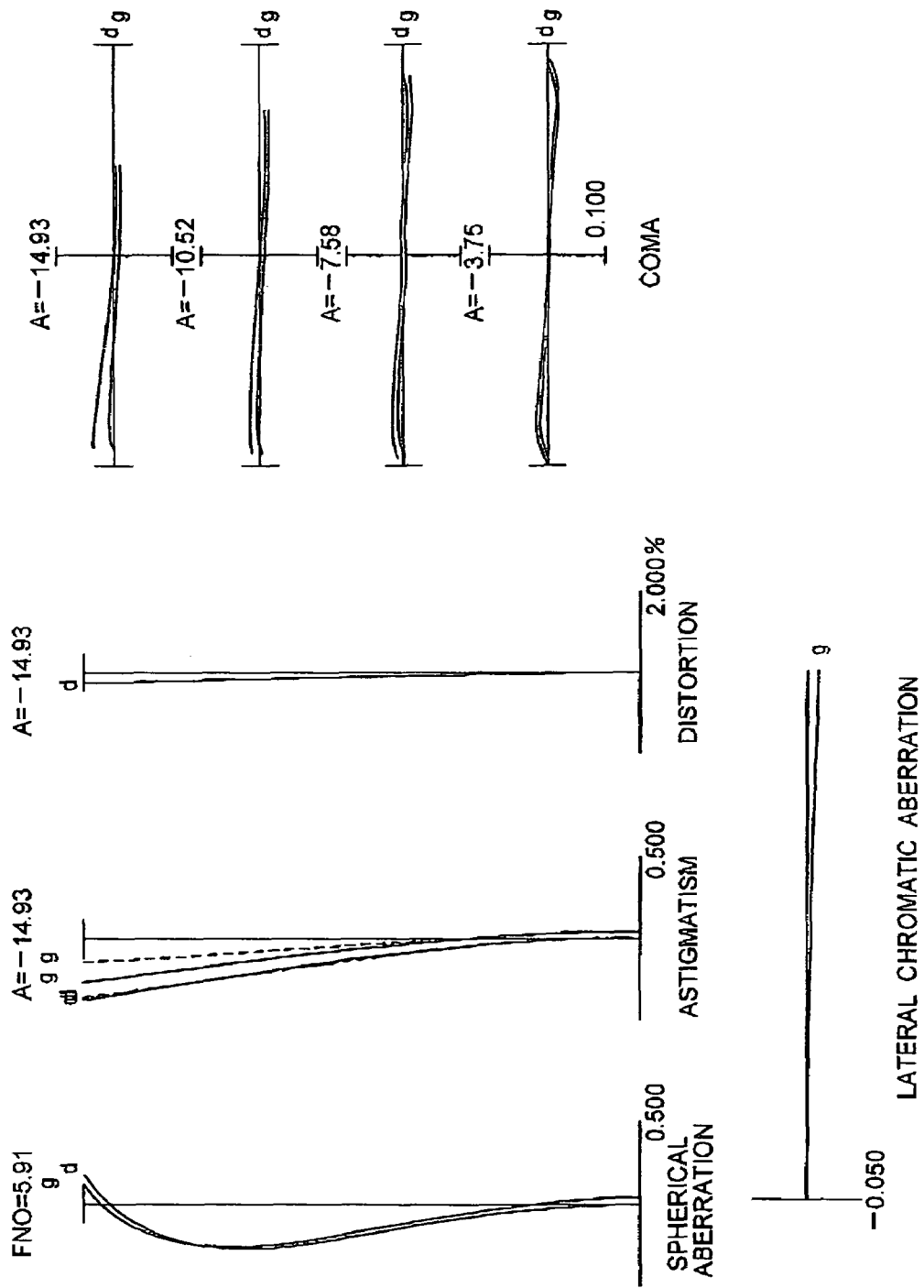
FIG. 12 graphically shows various aberrations of the zoom lens system according to Example 3 in a telephoto end state when the zoom lens is focused at infinity.

FIGS. 10, 11, and 12 graphically show various aberrations of the zoom lens system according to Example 3 in a wide-angle end state, an intermediate focal length state, and a telephoto end state, respectively, when the zoom lens system is focused at infinity.

As is apparent from the respective graphs, the zoom lens system according to Example 3 shows superb optical performance as a result of good corrections to various aberrations in each focal length state (the wide-angle end state, the intermediate focal length state, and the telephoto end state).

As described above, the present invention makes it possible to provide a zoom lens system having an angle of view of about 2A=76.4°-29.9°, a zoom ratio about 2.9, high cost performance, high optical performance, good productivity, and compactness of about a normal lens.

In a zoom lens system according to the present invention, sufficient effect of a vibration reduction lens can be obtained by shifting the front lens group $G_{2-1}$ or the rear lens group $G_{2-2}$ independently from the optical axis. Moreover, in a zoom lens system according to the present invention, sufficient effect of a vibration reduction lens can be obtained by shifting the second lens group G2 from the optical axis.

Second Embodiment

Basic construction of the zoom lens according to a second embodiment of the present invention is going to be explained below.

The present invention created a new lens type as a second lens group in a negative-positive two-group type zoom lens. As described later in each Example, the second lens group in a zoom lens system according to the present invention, basically starting from a Gauss type, may include, in order from an object, a front lens group $G_{2-1}$ and a rear lens group $G_{2-2}$. The front lens group $G_{2-1}$ may be composed of, in order from an object, a positive lens, and a cemented lens constructed by a positive lens $L_{ap}$ cemented with a negative lens $L_{an}$, and the rear lens group $G_{2-2}$ may be composed of a cemented lens constructed by a negative lens $L_{bn}$ cemented with a positive lens $L_{bp}$. Otherwise, the second lens group may include a front lens group $G_{2-1}$ which is composed of, in order from the object, a positive lens, and a cemented lens constructed by a positive lens $L_{ap}$ cemented with a negative lens $L_{an}$, and a rear lens group $G_{2-2}$ which is composed of a cemented lens constructed by a negative lens $L_{bn}$ cemented with a positive lens, and a positive lens $L_{bp}$.

In the present invention, an aperture stop is arranged in the front lens group $G_{2-1}$ or adjacent to the object side of the front lens group $G_{2-1}$. By arranging temperature stop to the object side of the rear lens group $G_{2-2}$ in this manner, the position of an exit pupil can be located further to the object side relative to the image plane. This is effective for an optical system for a digital camera to relieve reduction in peripheral light amount caused by shading or the like. In an extremely compact zoom lens such as the present invention, the back focal length as well as the total lens length generally become small, so that the exit pupil comes near to the image plane. However, owing to the aforementioned effect, the present invention makes it possible to secure sufficient distance between the exit pupil and the image plane.

By the way, shading means that when an angle of the off-axis ray incident to an imaging device relative to the optical axis becomes large, the off-axis ray is blocked by a micro-lens array arranged right in front of the imaging device.

Since the explanation of conditional expressions of a zoom lens system according to the second embodiment of the present invention is the same as those of the first embodiment, duplicated explanation is omitted.

Numerical examples according to the second embodiment of the present invention is explained blow with reference to accompanying drawings.

EXAMPLE 4

Figure 13:
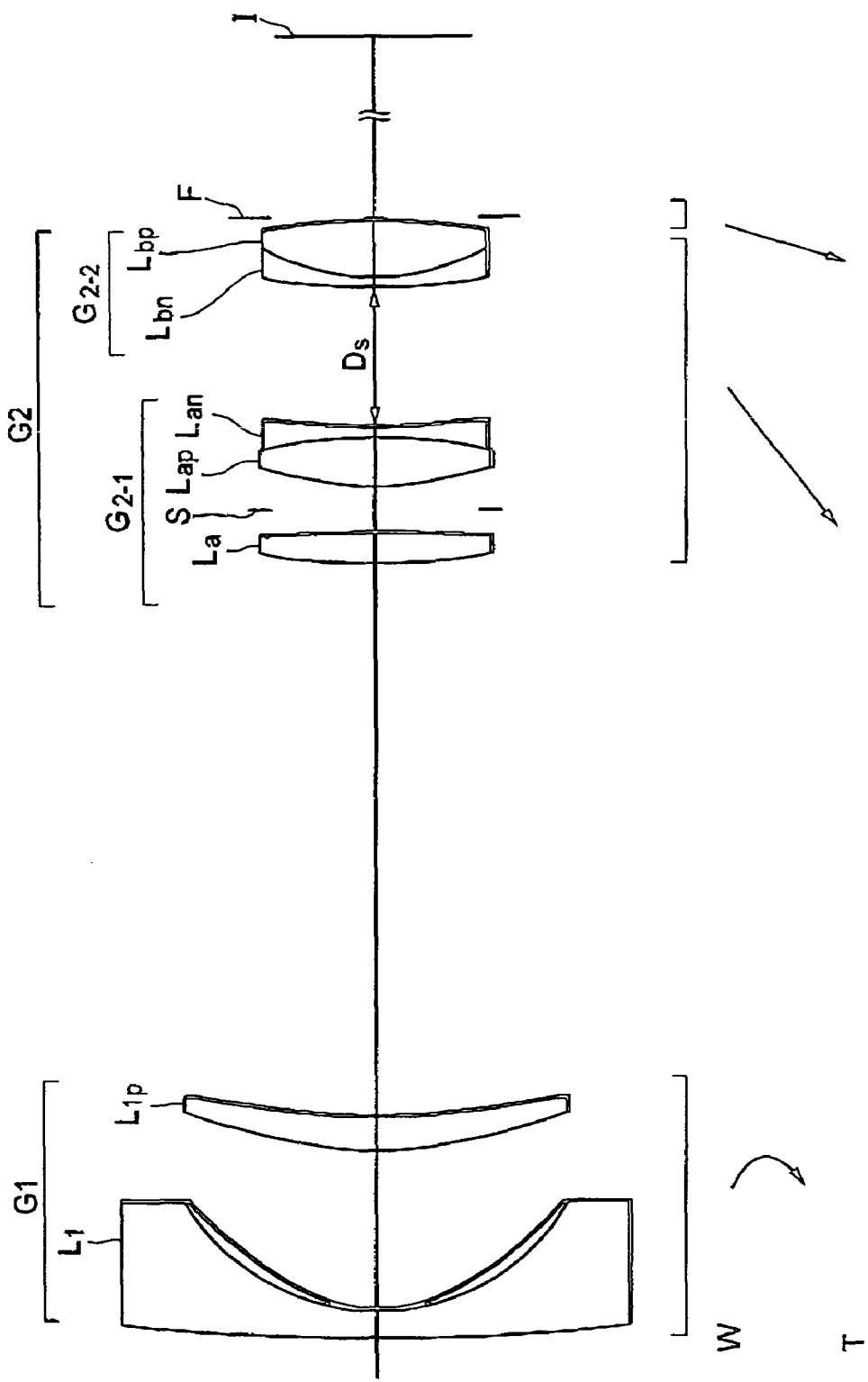
FIG. 13 is a diagram showing the lens arrangement of a zoom lens system according to Example 4 of a second embodiment of the present invention together with movement of each lens group.

FIG. 13 is a diagram showing the lens arrangement of a zoom lens system according to Example 4 of a second embodiment of the present invention together with movement of each lens group.

The zoom lens system according to Example 4 is a negative-positive two-group zoom lens system composed of, in order from an object, a first lens group G1 having negative refractive power, a second lens group G2 having positive refractive power, and a flare stopper F.

The first lens group G1 is composed of, in order from the object, a negative meniscus lens $L_1$ having a convex surface facing to the object, and a positive meniscus lens $L_{1p}$ having a convex surface facing to the object. The negative meniscus lens $L_1$ is a compound lens constructed by glass and resin. Resin is arranged on the image side surface of the lens. The image side surface of the resin is an aspherical surface.

The second lens group G2 is composed of, in order from the object, a front lens group $G_{2-1}$, and a rear lens group $G_{2-2}$.

The front lens group $G_{2-1}$ is composed of, in order from the object, a double convex positive lens $L_a$, an aperture stop S, and a cemented negative lens constructed by a double convex positive lens $L_{ap}$ cemented with a double concave negative lens $L_{an}$.

The rear lens group $G_{2-2}$ is composed of, in order from the object, a cemented positive lens constructed by a negative meniscus lens $L_{bn}$ having a convex surface facing to the object cemented with a double convex positive lens $L_{bp}$.

In a zoom lens system according to Example 4 of the present invention, when the state of lens group positions varies from a wide-angle end state (W) to a telephoto end state (T), zooming is carried out by moving the first lens group G1 and the second lens group G2 such that an air space between the first lens group G1 and the second lens group G2 decreases. The above-mentioned flare stopper F has a fixed diameter aperture and moves independently along a moving trajectory different from that of the second lens group G2 upon zooming.

In a zoom lens system according to Example 4, focusing to a close object is carried out by moving the first lens group G1 to the object side.

Various values according to Example 4 are shown in Table 4.

In a zoom lens system according to the second embodiment of the present invention, an aspherical surface is expressed by the following expression;

$$S(y) = (y^2/R)/[1 + (1 - \kappa \cdot (y^2/R^2))^{1/2}] + C3 \cdot |y|^3 + C4 \cdot y^4 + C6 \cdot y^6 + C8 \cdot y^8 + C10 \cdot y^{10}$$

where y denotes a height from the optical axis, S(y) denotes a distance (sag amount) along the optical axis from tangent plane at the vertex of the aspherical surface to the aspherical surface at the height y, R denotes a radius of curvature of a reference sphere (a paraxial radius of curvature), κ denotes a conical coefficient, and Cn denote n-th order aspherical coefficient, respectively.

TABLE 4

[Specifications]

f = 18.5-53.5
A = 38.9-14.93°
FNO = 3.56-5.9

[Lens Data]

| Surface Number | r | d | ν | n |
|---|---|---|---|---|
| 1) | 181.0591 | 2.0000 | 49.61 | 1.772500 |
| 2) | 17.2000 | 0.2000 | 38.09 | 1.553890 |
| *3) | 12.7630 | 12.2500 | | |
| 4) | 33.8814 | 2.8000 | 23.06 | 1.860740 |
| 5) | 65.8125 | D5 | | |
| 6) | 42.5378 | 2.6000 | 81.61 | 1.497000 |
| 7) | −94.5446 | 1.8000 | | |
| 8> | | 2.0000 | Aperture Stop S | |
| 9) | 24.2385 | 4.0000 | 64.10 | 1.516800 |
| 10) | −35.8523 | 0.8000 | 49.61 | 1.772500 |
| 11) | 67.2430 | 11.2000 | | |
| 12) | 54.1555 | 0.8000 | 37.17 | 1.834000 |
| 13) | 15.5723 | 4.5000 | 64.10 | 1.516800 |
| 14) | −35.4635 | D14 | | |
| 15) | | D15 | Flare Stopper F | |

[Aspherical Data]
Surface Number 3

κ = 0.0375
C3 = 0.79879E−05
C4 = 3.03680E−06
C6 = −2.15160E−08
C8 = 5.25940E−11
C10 = −2.58910E−13

[Variable Intervals]

| | 1-POS | 2-POS | 3-POS |
|---|---|---|---|
| f | 18.50000 | 35.00000 | 53.50000 |
| D5 | 44.09357 | 13.18951 | 1.20774 |
| D14 | 0.00000 | 11.09166 | 23.52778 |
| D15 | 41.84285 | 50.91785 | 61.09285 |

| | 4-Pos | 5-Pos | 6-Pos |
|---|---|---|---|
| β | −0.02500 | −0.02500 | −0.02500 |
| D5 | 45.43445 | 13.89826 | 1.67141 |
| D14 | 0.00000 | 11.09166 | 23.52778 |
| D15 | 41.84285 | 50.91785 | 61.09285 |

| | 7-POS | 8-POS | 9-POS |
|---|---|---|---|
| β | −0.13159 | −0.23049 | −0.38023 |
| D5 | 51.15122 | 19.72380 | 8.25968 |
| D14 | 0.00000 | 11.09166 | 23.52778 |
| D15 | 41.84285 | 50.91785 | 61.09285 |

[Values for Conditional Expressions]

(1) Ds/D = 0.404
(2) $f_b/f_a$ = 2.16
(3) $n_{an} - n_{ap}$ = 0.256
(4) $n_{bn} - n_{bp}$ = 0.317
(5) $ν_{lp}$ = 23.1
(6) $n_{lp}$ = 1.861

Figure 14:
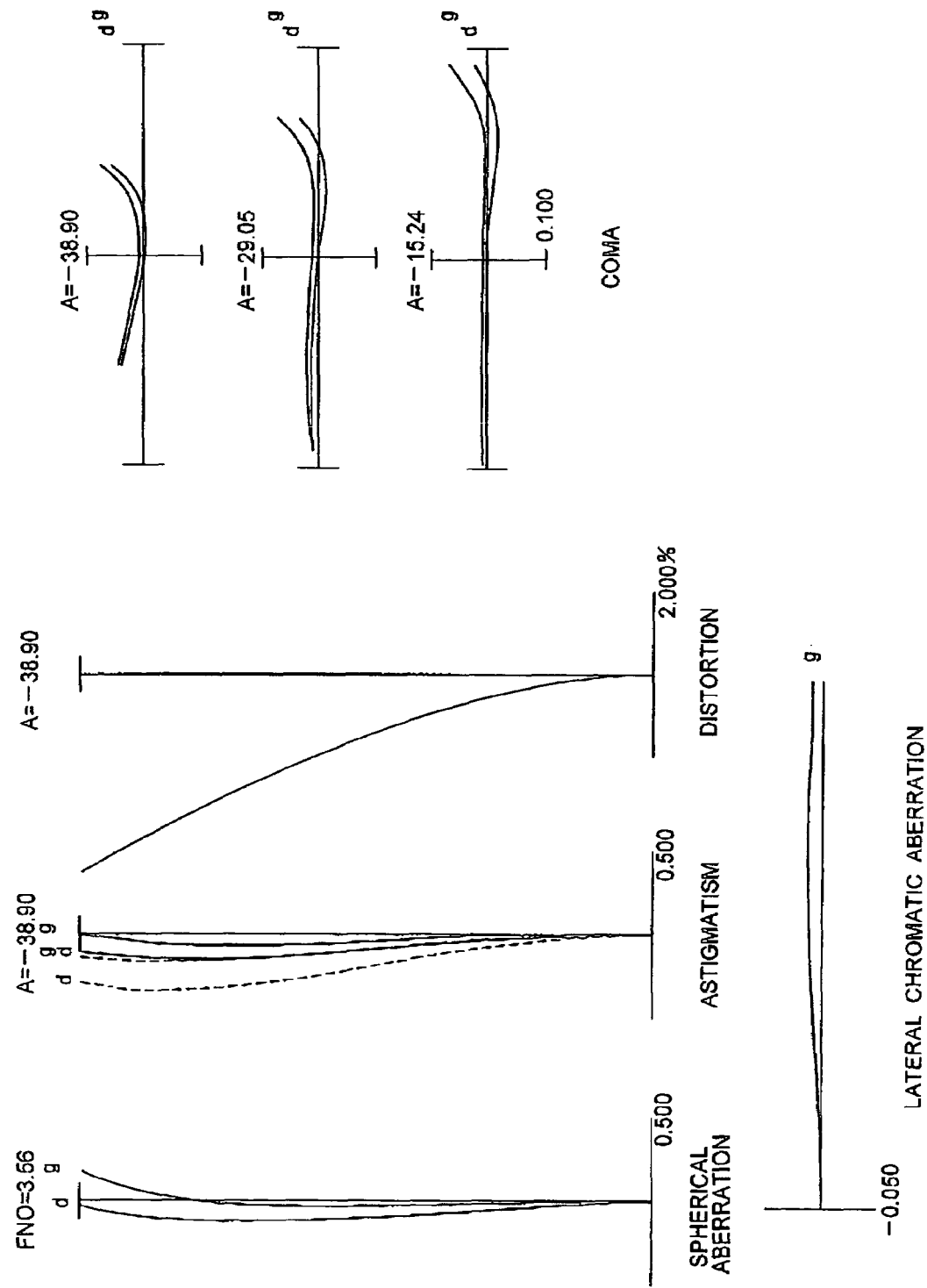
FIG. 14 graphically shows various aberrations of the zoom lens system according to Example 4 in a wide-angle end state when the zoom lens is focused at infinity.
Figure 15:
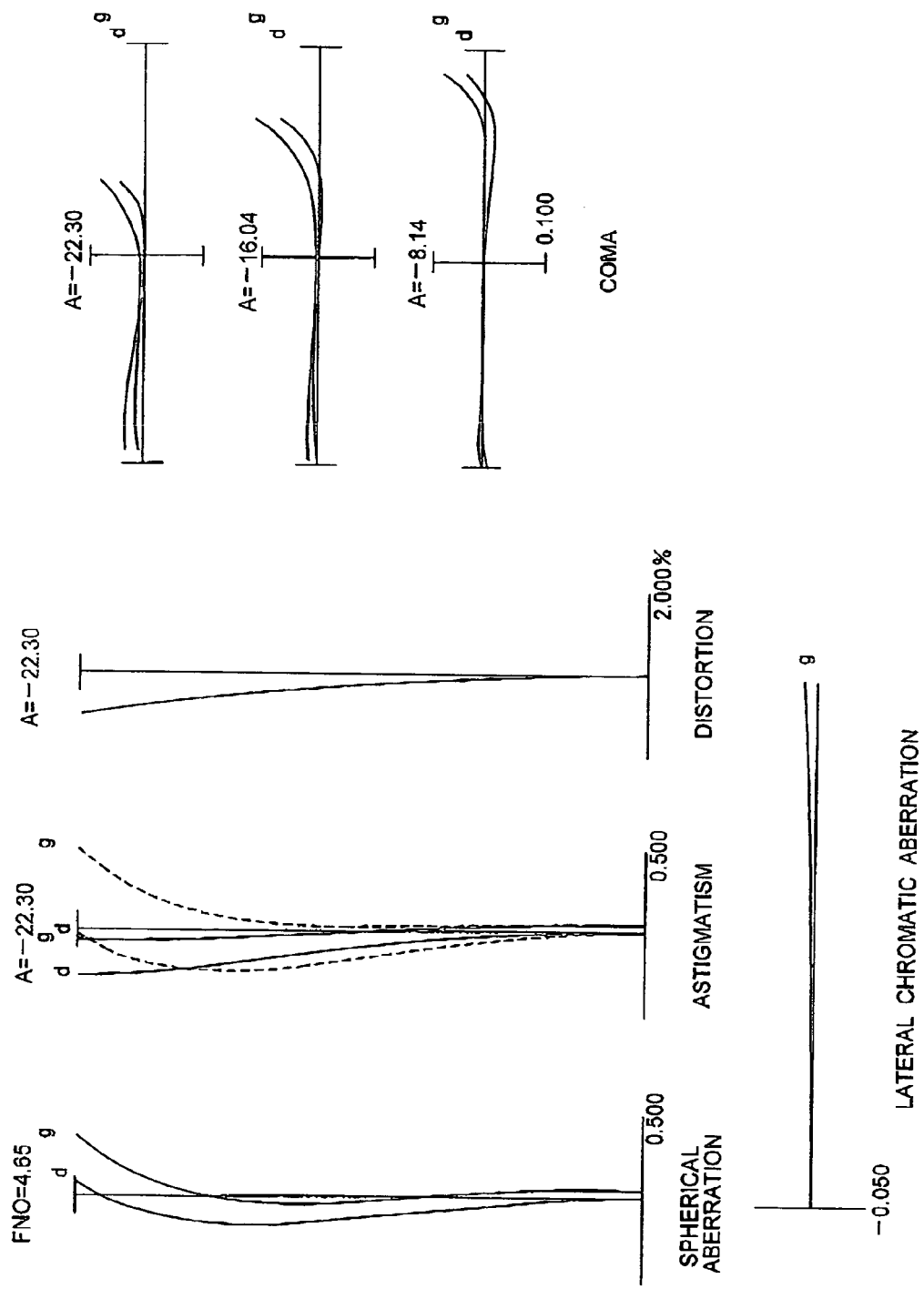
FIG. 15 graphically shows various aberrations of the zoom lens system according to Example 4 in an intermediate focal length state when the zoom lens is focused at infinity.
Figure 16:
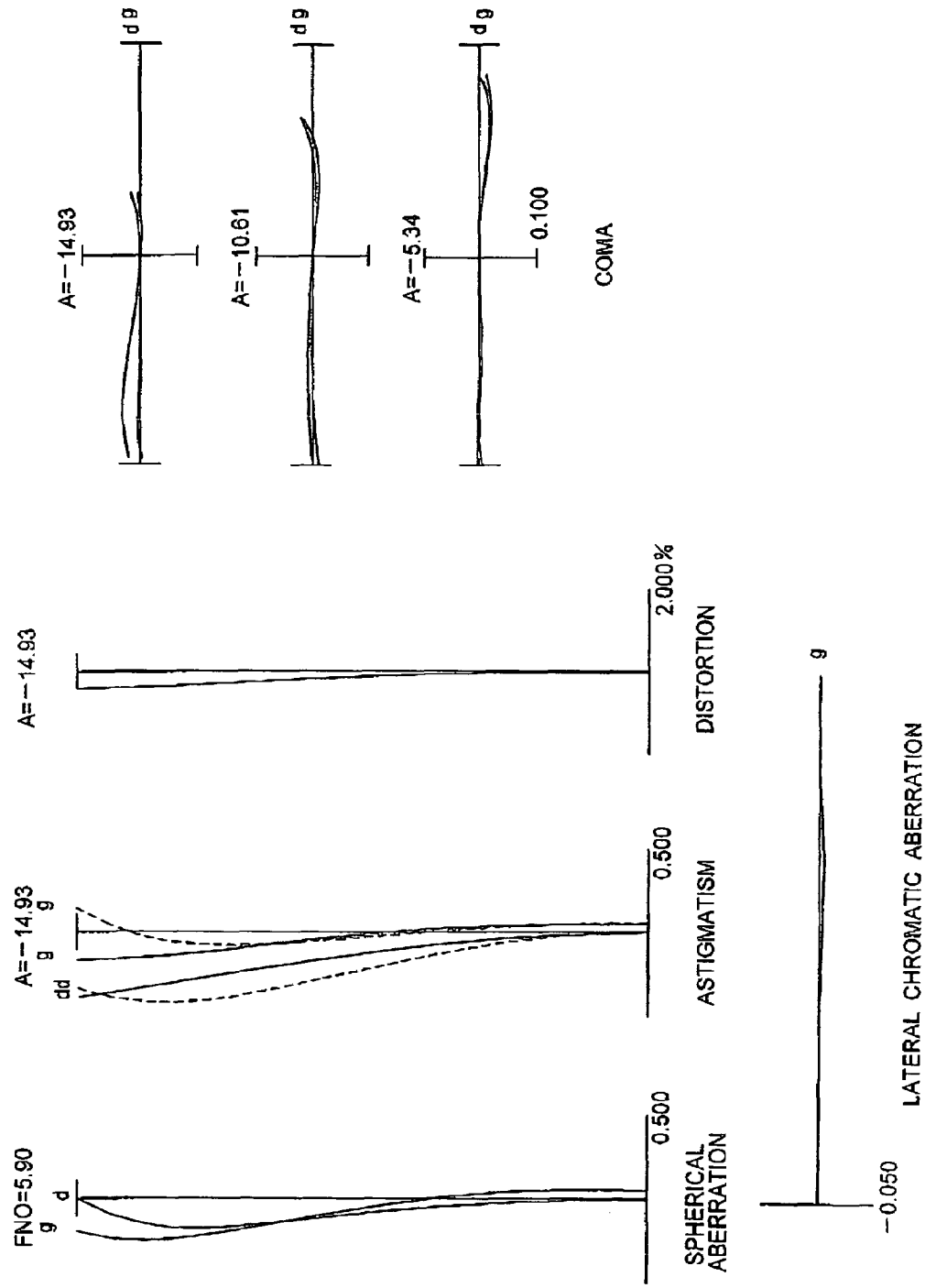
FIG. 16 graphically shows various aberrations of the zoom lens system according to Example 4 in a telephoto end state when the zoom lens is focused at infinity.

FIGS. 14, 15, and 16 graphically show various aberrations of the zoom lens system according to Example 4 in a wide-angle end state, an intermediate focal length state, and a telephoto end state, respectively, when the zoom lens system is focused at infinity.

As is apparent from the respective graphs, the zoom lens system according to Example 4 shows superb optical performance as a result of good corrections to various aberrations in each focal length state (the wide-angle end state, the intermediate focal length state, and the telephoto end state).

EXAMPLE 5

Figure 17:
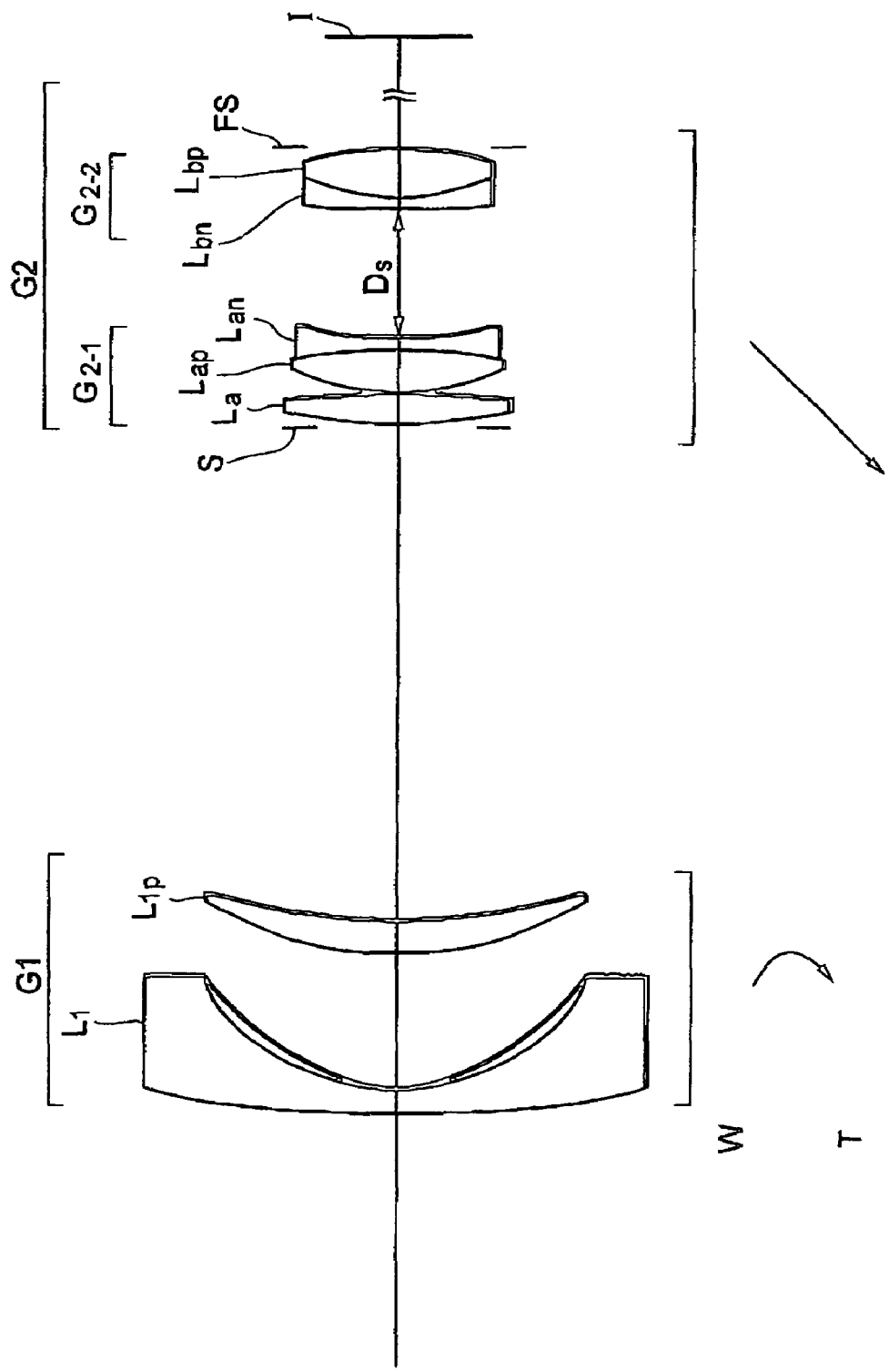
FIG. 17 is a diagram showing the lens arrangement of a zoom lens system according to Example 5 of the second embodiment of the present invention together with movement of each lens group.

FIG. 17 is a diagram showing the lens arrangement of a zoom lens system according to Example 5 of the second embodiment of the present invention together with movement of each lens group.

The zoom lens system according to Example 5 is a negative-positive two-group zoom lens system composed of, in order from an object, a first lens group G1 having negative refractive power and a second lens group G2 having positive refractive power.

The first lens group G1 is composed of, in order from the object, a negative meniscus lens $L_1$ having a convex surface facing to the object, and a positive meniscus lens $L_{1p}$ having a convex surface facing to the object. The negative meniscus lens $L_1$ is a compound lens constructed by glass and resin. Resin is arranged on the image side surface of the lens. The image side surface of the resin is an aspherical surface.

The second lens group G2 is composed of, in order from the object, an aperture stop S, a front lens group, a rear lens group $G_{2-2}$, and a fixed stop FS. Incidentally, the aperture stop S is arranged adjacent to the object side of the front lens group $G_{2-1}$.

The front lens group $G_{2-1}$ is composed of, in order from the object, a double convex positive lens $L_a$, and a cemented negative lens constructed by a double convex positive lens $L_{ap}$ cemented with a double concave negative lens $L_{an}$.

The rear lens group $G_{2-2}$ is composed of, in order from the object, a cemented positive lens constructed by a negative meniscus lens $L_{bn}$ having a convex surface facing to the object cemented with a double convex positive lens $L_{bp}$.

In a zoom lens system according to Example 5, when the state of lens group positions varies from a wide-angle end state (W) to a telephoto end state (T), zooming is carried out by moving the first lens group G1 and the second lens group G2 such that an air space between the first lens group G1 and the second lens group G2 decreases. Upon zooming, the aperture stop S moves together with the front lens group $G_{2-1}$ and the rear lens group $G_{2-2}$ in a body.

In a zoom lens system according to Example 5, focusing to a close object is carried out by moving the first lens group G1 to the object side.

Various values according to Example 5 are shown in Table 5.

TABLE 5

[Specifications]

f = 18.5-53.4
A = 38.3-14.92°
FNO = 3.6-5.9

[Lens Data]

| Surface Number | r | d | ν | n |
|---|---|---|---|---|
| 1) | 86.5539 | 1.8000 | 49.61 | 1.772500 |
| 2) | 16.0000 | 0.2000 | 38.70 | 1.552230 |
| 3*) | 12.1665 | 10.7995 | | |
| 4) | 26.9923 | 2.5000 | 22.76 | 1.808090 |
| 5) | 44.6158 | D5 | | |
| 6) | | 0.1000 | Aperture Stop S | |
| 7) | 38.5505 | 2.5000 | 55.38 | 1.638540 |
| 8) | −55.9183 | 0.1000 | | |
| 9) | 18.6738 | 3.5000 | 64.10 | 1.516800 |
| 10) | −32.6160 | 0.8000 | 46.58 | 1.804000 |
| 11) | 26.8523 | 10.7839 | | |
| 12) | 85.5647 | 0.8000 | 37.17 | 1.834000 |
| 13) | 16.4881 | 4.0000 | 64.10 | 1.516800 |
| 14) | −23.7659 | 0.0000 | | |
| 15) | | D15 | Fixed Stop FS | |

[Aspherical Data]
Surface Number 3

K = −0.5076
C3 = 0.00000E−00
C4 = 5.17550E−05
C6 = −5.62150E−08
C8 = 5.34710E−11
C10 = −2.24340E−13

[Variable Intervals]

| | 1-POS | 2-POS | 3-POS |
|---|---|---|---|
| f | 18.50000 | 31.50000 | 53.40000 |
| D0 | ∞ | ∞ | ∞ |
| D5 | 40.23414 | 15.63955 | 1.18562 |
| D15 | 38.95217 | 53.39662 | 77.72995 |

| | 4-Pos | 5-Pos | 6-Pos |
|---|---|---|---|
| β | −0.02500 | −0.02500 | −0.02500 |
| D0 | 710.5943 | 1230.5943 | 2106.5943 |
| D5 | 41.57502 | 16.32705 | 1.65016 |
| D15 | 38.95217 | 53.39662 | 77.72995 |

| | 7-POS | 8-POS | 9-POS |
|---|---|---|---|
| β | −0.07154 | −0.11715 | −0.20636 |
| D0 | 229.1933 | 239.4904 | 229.3666 |
| D5 | 43.97117 | 19.22964 | 5.02007 |
| D15 | 38.95217 | 53.39662 | 77.72995 |

TABLE 5-continued

[Values for Conditional Expressions]

(1) Ds/D = 0.480
(2) $f_b/f_a$ = 1.76
(3) $n_{an}-n_{ap}$ = 0.287
(4) $n_{bn}-n_{bp}$ = 0.317
(5) $ν_{1p}$ = 22.8
(6) $n_{1p}$ = 1.808

Figure 18:
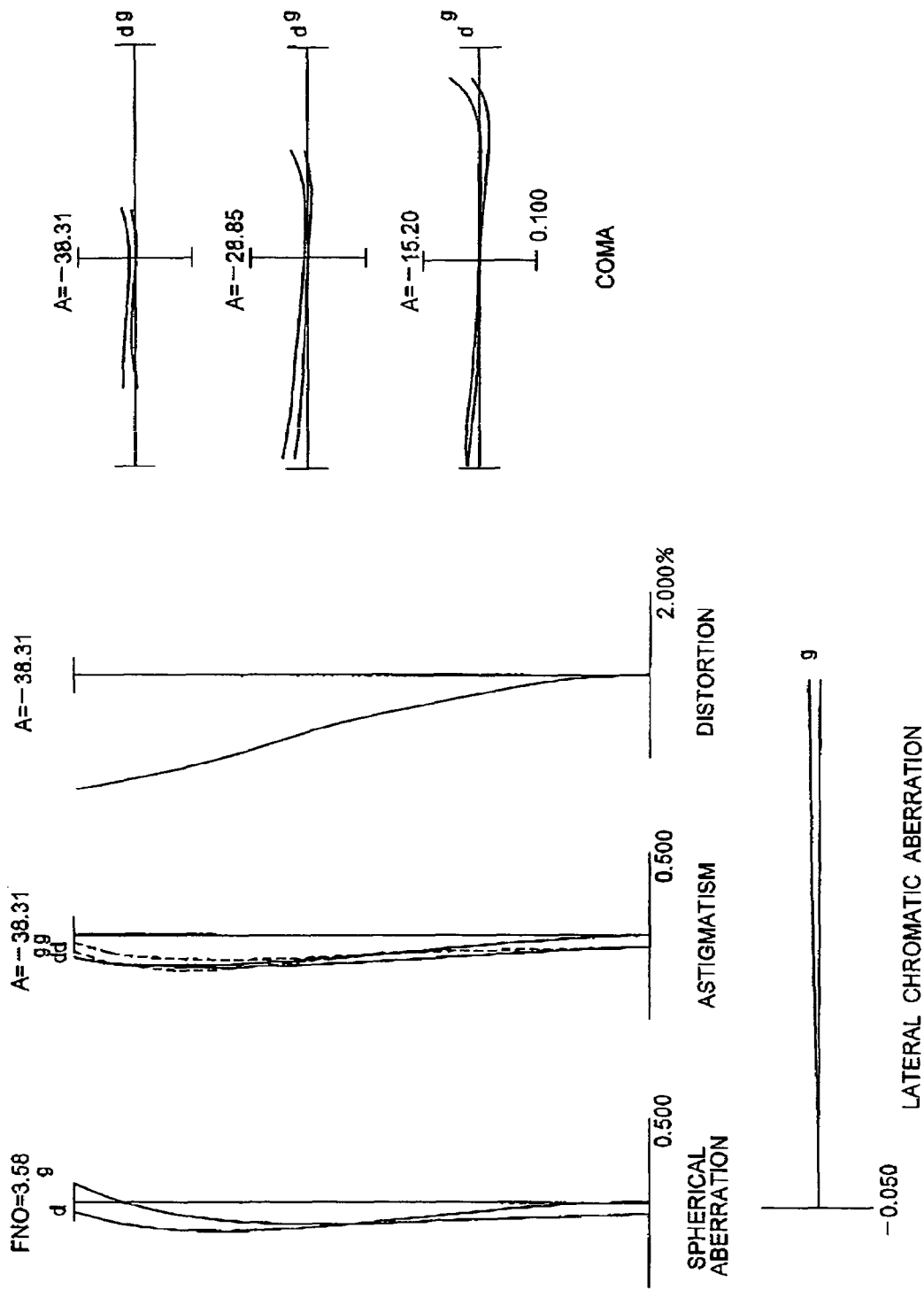
FIG. 18 graphically shows various aberrations of the zoom lens system according to Example 5 in a wide-angle end state when the zoom lens is focused at infinity.
Figure 19:
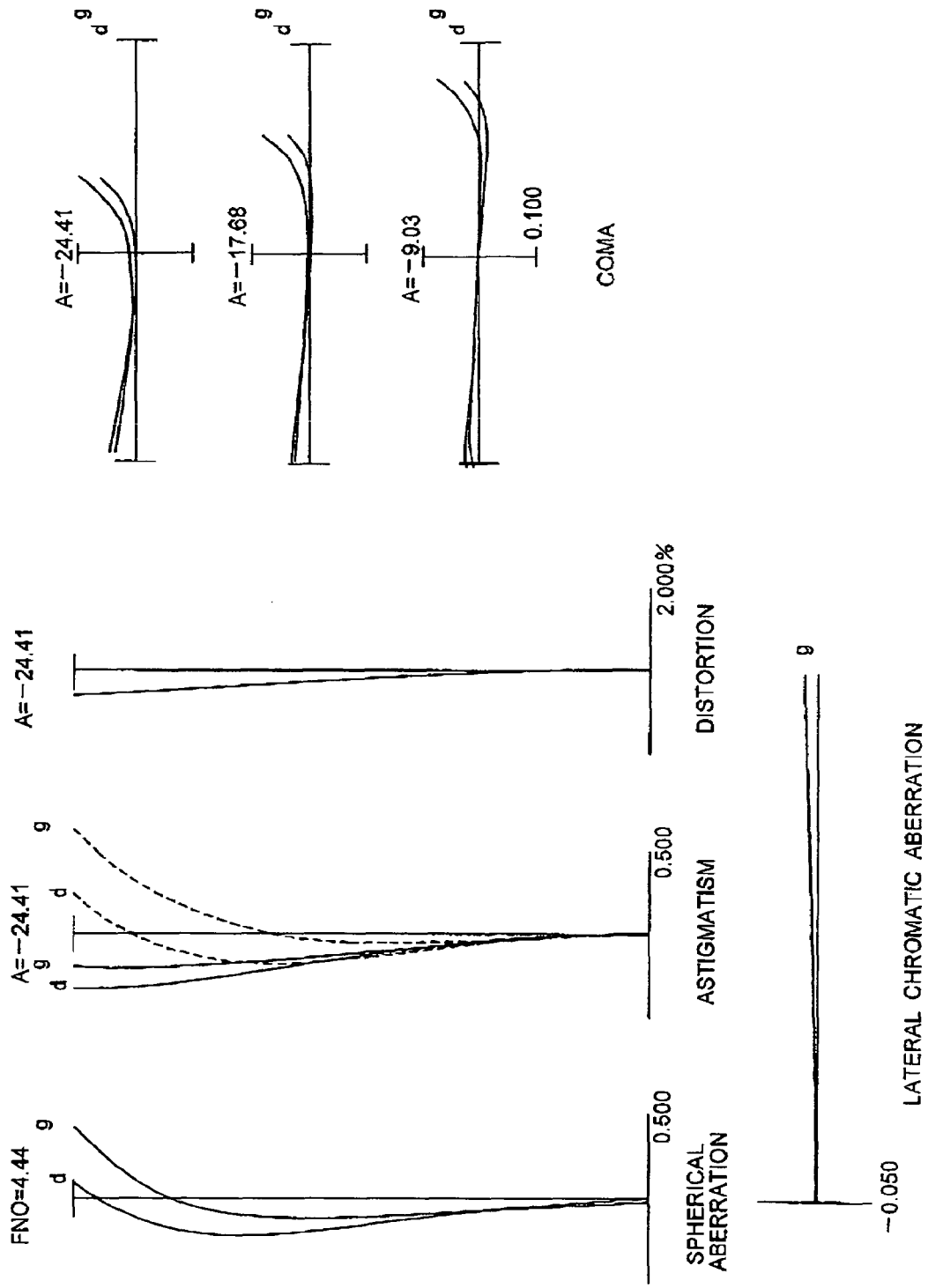
FIG. 19 graphically shows various aberrations of the zoom lens system according to Example 5 in an intermediate focal length state when the zoom lens is focused at infinity.
Figure 20:
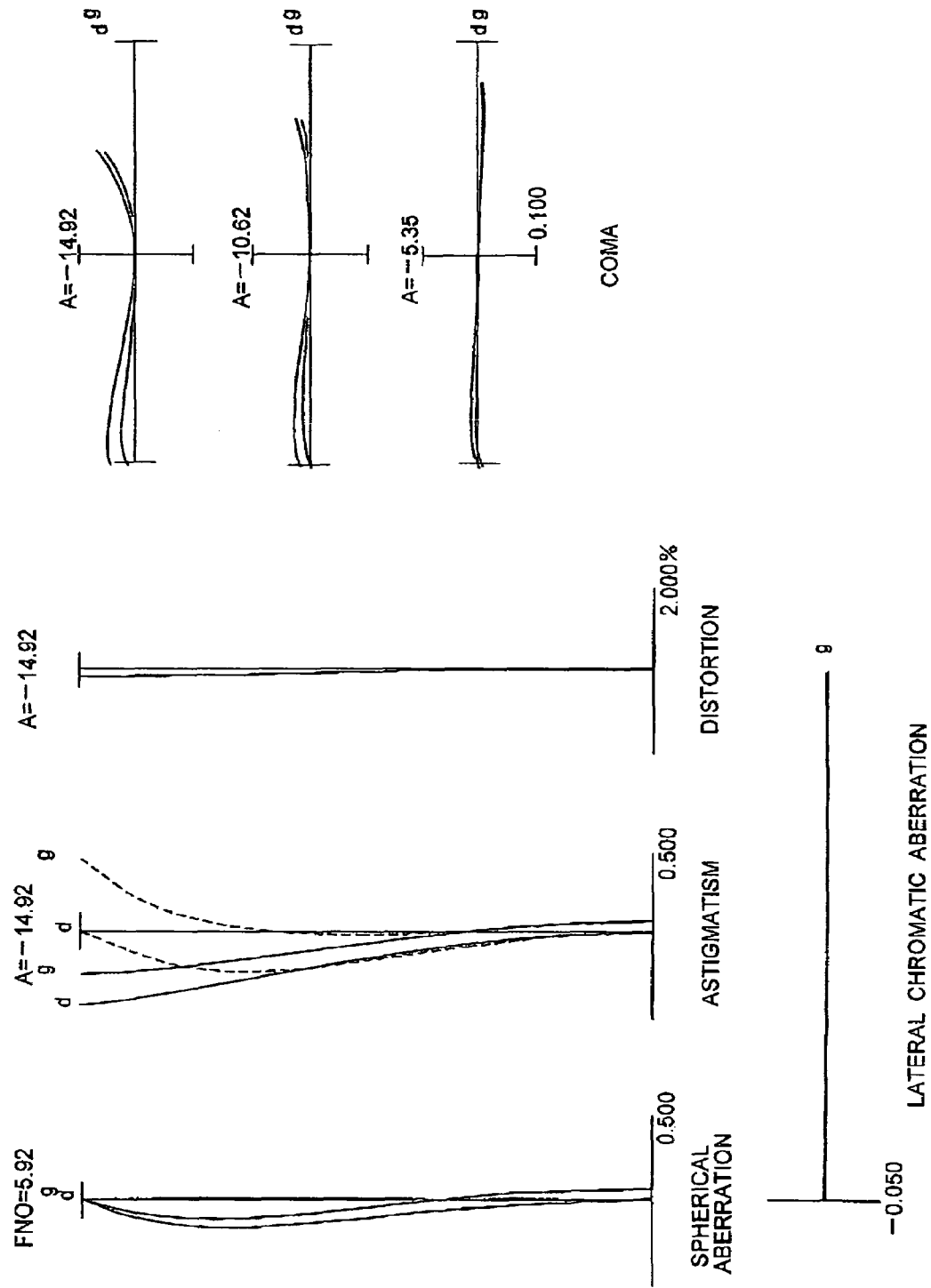
FIG. 20 graphically shows various aberrations of the zoom lens system according to Example 5 in a telephoto end state when the zoom lens is focused at infinity.

FIGS. 18, 19, and 20 graphically show various aberrations of the zoom lens system according to Example 5 in a wide-angle end state, an intermediate focal length state, and a telephoto end state, respectively, when the zoom lens system is focused at infinity.

As is apparent from the respective graphs, the zoom lens system according to Example 5 shows superb optical performance as a result of good corrections to various aberrations in each focal length state (the wide-angle end state, the intermediate focal length state, and the telephoto end state).

EXAMPLE 6

Figure 21:
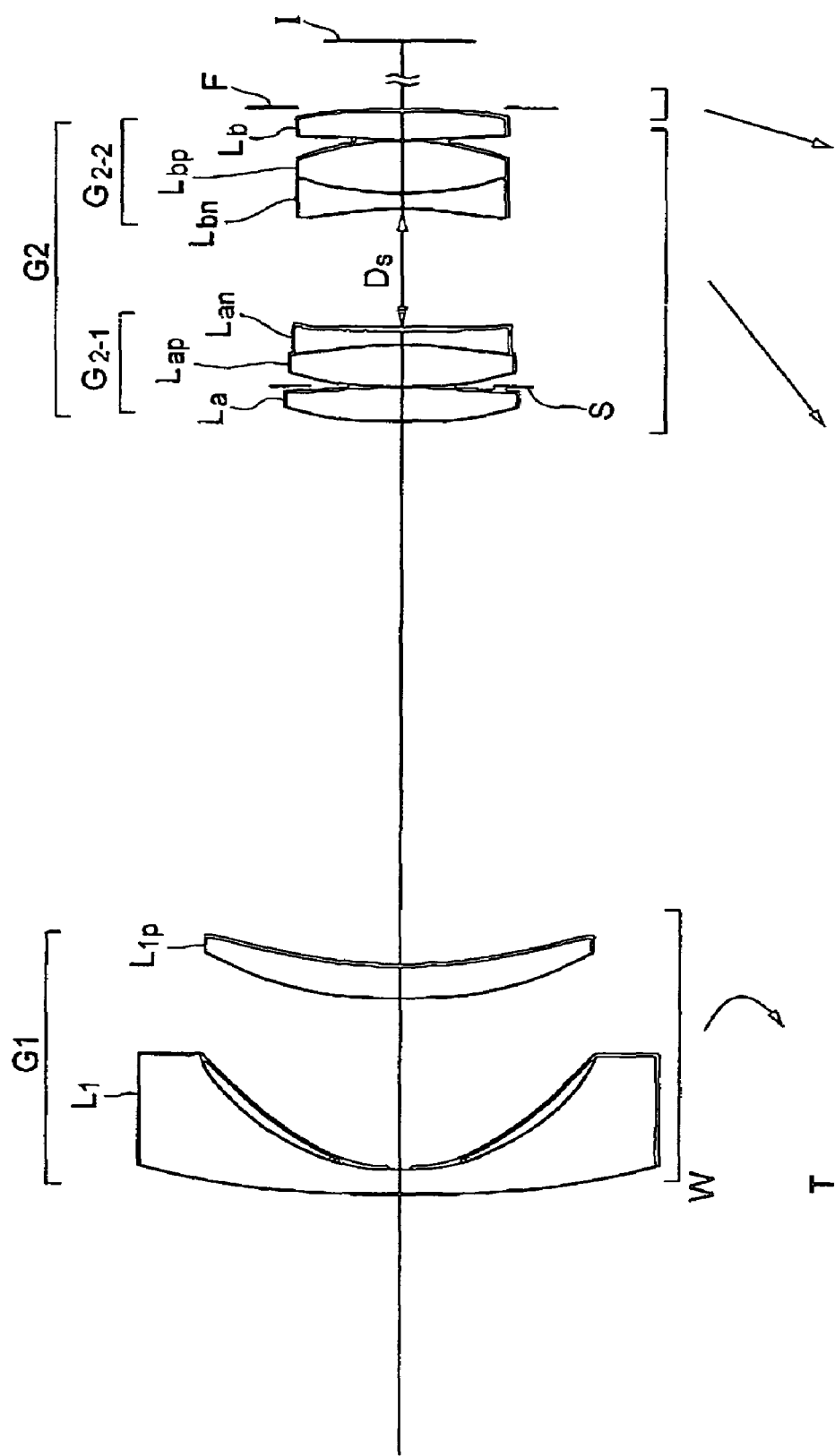
FIG. 21 is a diagram showing the lens arrangement of a zoom lens system according to Example 6 of the second embodiment of the present invention together with movement of each lens group.

FIG. 21 is a diagram showing the lens arrangement of a zoom lens system according to Example 6 of the second embodiment of the present invention together with movement of each lens group.

The zoom lens system according to Example 6 is a negative-positive two-group zoom lens system composed of, in order from an object, a first lens group G1 having negative refractive power, a second lens group G2 having positive refractive power, and a flare stopper F.

The first lens group G1 is composed of, in order from the object, a negative meniscus lens $L_1$ having a convex surface facing to the object, and a positive meniscus lens $L_{1p}$ having a convex surface facing to the object. The negative meniscus lens $L_1$ is a compound lens constructed by glass and resin. Resin is arranged on the image side surface of the lens. The image side surface of the resin is an aspherical surface.

The second lens group G2 is composed of, in order from the object, a front lens group $G_{2-1}$, and a rear lens group $G_{2-2}$.

The front lens group $G_{2-1}$ is composed of, in order from the object, a double convex positive lens $L_a$, an aperture stop S, and a cemented negative lens constructed by a double convex positive lens $L_{ap}$ cemented with a double concave negative lens $L_{an}$.

The rear lens group $G_{2-2}$ is composed of, in order front the object, a cemented negative lens constructed by a negative meniscus lens $L_{bn}$ having a convex surface facing to the object cemented with a double convex positive lens $L_{bp}$, and a double convex positive lens $L_b$.

In a zoom lens system according to Example 6, when the states of lens group positions varies from a wide-angle end state (W) to a telephoto end state (T), zooming is carried out by moving the first lens group G1 and the second lens group G2 such that an air space between the first lens group G1 and the second lens group G2 decreases.

In a zoom lens system according to Example 6, focusing to a chose object is carried out by moving the first lens group G1 to the object side.

The aforementioned flare stopper E has a fixed diameter and moves independently along a moving trajectory different from that of the second lens group G2 upon zooming.

Various values according to Example 6 are shown in Table 6.

TABLE 6

[Specifications]

f = 18.5-53.4 mm
A = 38.2-14.93°
FNO = 3.6-5.9

[Lens Data]

| Surface Number | r | d | ν | n |
|---|---|---|---|---|
| 1) | 83.0076 | 1.8000 | 49.61 | 1.772500 |
| 2) | 16.5000 | 0.2000 | 38.70 | 1.552230 |
| 3*) | 12.6003 | 13.3087 | | |
| 4) | 28.5874 | 2.8000 | 22.76 | 1.808090 |
| 5) | 43.4120 | D5 | | |
| 6) | 28.4446 | 3.0000 | 55.38 | 1.638540 |
| 7) | −79.3719 | 0.1000 | | |
| 8) | | 0.0000 | Aperture Stop S | |
| 9) | 33.4115 | 3.5000 | 64.10 | 1.516800 |
| 10) | −31.0350 | 1.0000 | 46.58 | 1.804000 |
| 11) | 65.3951 | 10.0718 | | |
| 12) | −28.2267 | 1.0000 | 46.58 | 1.804000 |
| 13) | 21.7458 | 4.2000 | 82.52 | 1.497820 |
| 14) | −17.9528 | 0.1000 | | |
| 15) | 91.5812 | 2.3000 | 70.41 | 1.487490 |
| 16) | −47.8355 | D16 | | |
| 17) | | D17 | Flare Stopper F | |

[Aspherical Data]
Surface Number 3

κ = −0.9766
C3 = 0.00000E−00
C4 = 7.59690E−05
C6 = −1.78000E−07
C8 = 4.03250E−10
C10 = −5.80270E−13

[Variable Intervals]

| | 1-POS | 2-POS | 3-POS |
|---|---|---|---|
| f | 18.50000 | 31.43000 | 53.40000 |
| D0 | ∞ | ∞ | ∞ |
| D5 | 43.62877 | 17.01071 | 1.34180 |
| D16 | 0.00000 | 6.23924 | 16.84063 |
| D17 | 41.78742 | 51.14628 | 67.04837 |

| | 4-Pos | 5-Pos | 6-Pos |
|---|---|---|---|
| β | −0.02500 | −0.02500 | −0.02500 |
| D0 | 710.5710 | 1227.7709 | 2106.5709 |
| D5 | 44.96965 | 17.79996 | 1.80634 |
| D16 | 0.00000 | 6.23924 | 16.84063 |
| D17 | 41.78742 | 51.14628 | 67.04837 |

| | 7-POS | 8-POS | 9-POS |
|---|---|---|---|
| β | −0.07502 | −0.12191 | −0.21637 |
| D0 | 217.1797 | 228.3744 | 217.3682 |
| D5 | 47.65235 | 20.85957 | 5.36231 |
| D16 | 0.00000 | 6.23924 | 16.84063 |
| D17 | 41.78742 | 51.14628 | 67.04837 |

[Values for Conditional Expressions]

(1) Ds/D = 0.399
(2) $f_b/f_a$ = 4.17
(3) $n_{an} - n_{ap}$ = 0.287
(4) $n_{bn} - n_{bp}$ = 0.306
(5) $\nu_{lp}$ = 22.8
(6) $n_{lp}$ = 1.808

Figure 22:
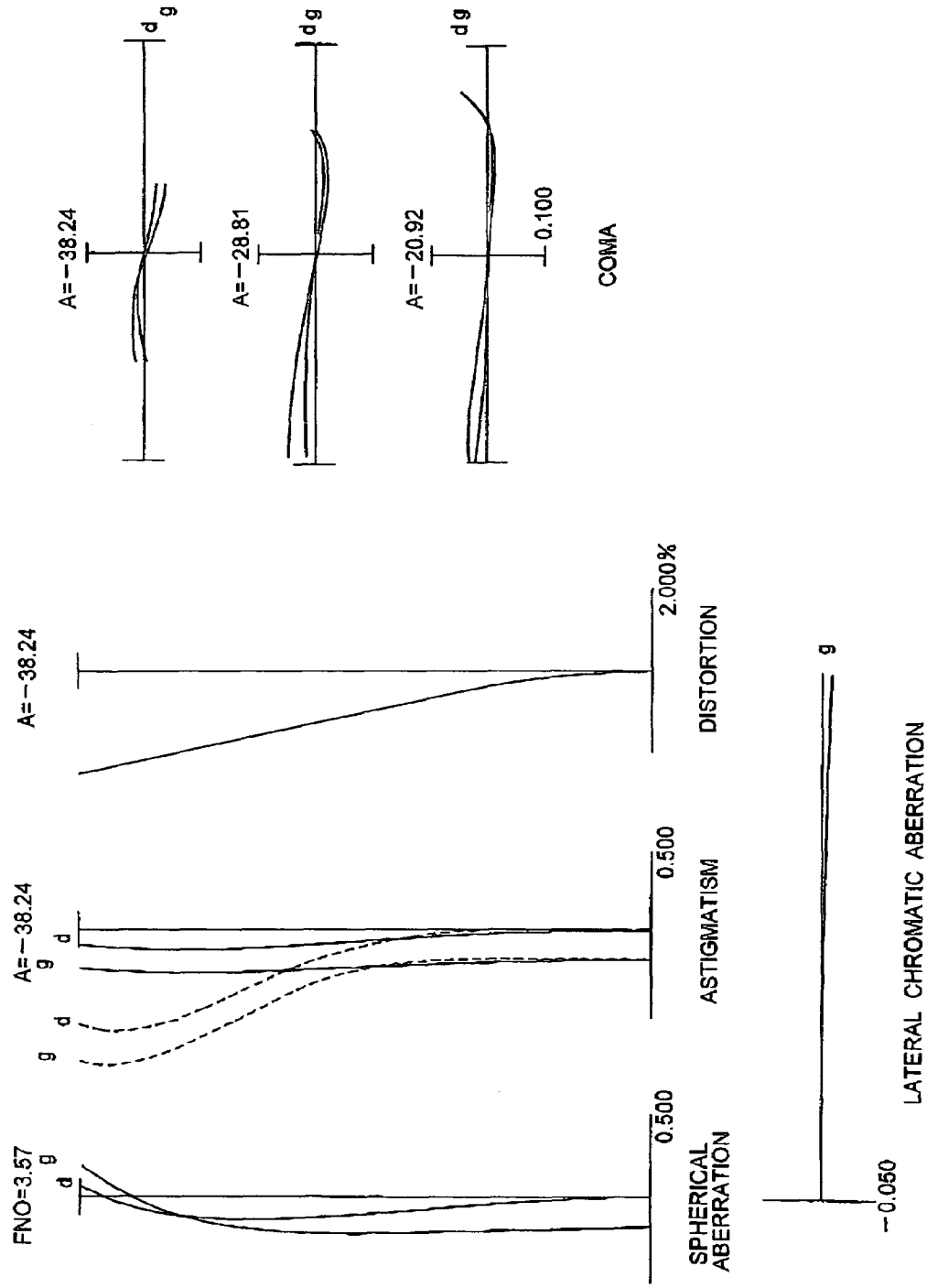
FIG. 22 graphically shows various aberrations of the zoom lens system according to Example 6 in a wide-angle end state when the zoom lens is focused at infinity.
Figure 23:
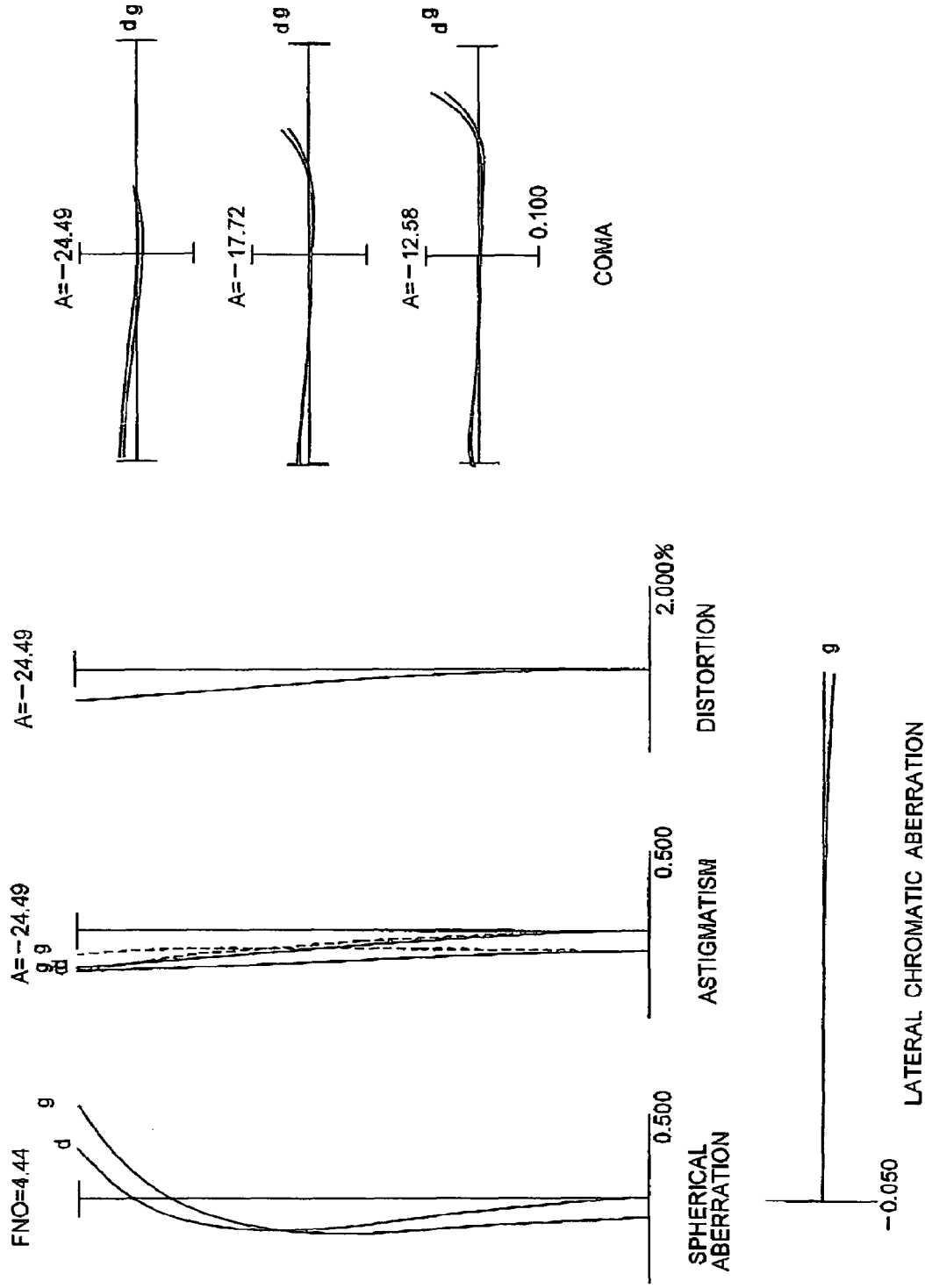
FIG. 23 graphically shows various aberrations of the zoom lens system according to Example 6 in an intermediate focal length state when the zoom lens is focused at infinity.

FIGS. 22, 23, and 24 graphically show various aberrations of the zoom lens system according to Example 6 in a wide-angle end state, an intermediate focal length state, and a telephoto end state, respectively, when the zoom lens system is focused at infinity.

As is apparent from the respective graphs, the zoom lens system according to Example 6 shows superb optical performance as a result of good corrections to various aberrations in each focal length state (the wide-angle end state, the intermediate focal length state, and the telephoto end state).

As described above, the present invention makes it possible to provide a zoom lens system having an angle of view of about 2A=76.4° to 29.9°, a zoom ratio about 2.9, high cost performance, high optical performance, good productivity, and compactness of about a normal and wide-angle zoom lens.

In a zoom lens system according to the present invention, sufficient effect of a vibration reduction lens can be obtained by shifting the front lens group $G_{2-1}$ or the rear lens group $G_{2-2}$ independently from the optical axis. Moreover, in a zoom lens system according to the present invention, sufficient effect of a vibration reduction lens can be obtained by shifting the second lens group G2 from the optical axis.

Although a two-lens-group type zoom lens system is shown as an example of the present invention, it is needless to say that a three-lens-group type and a more-lens-group type including the two-lens-group type zoom lens system are within the scope of the present invention including the spirit of the present invention.

In the construction of each lens group, it is needless to say that a lens group simply adding an additional lens to a lens group according to an example of the present invention is within the scope of the present invention including the spirit of the present invention.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having negative refractive power; and
   a second lens group having positive refractive power;
   zooming being carried out by varying an air space between the first lens group and the second lens group;
   the first lens group including in order, from the object, a negative lens, and a positive lens;
   the second lens group including, in order from the object, a front lens group having positive refractive power and a rear lens group having positive refractive power;
   the front lens group including, in order from the object, a positive lens and a cemented lens constructed by a positive lens cemented with a negative lens;
   the rear lens group including, in order from the object, a cemented lens constructed by a negative lens cemented with a positive lens; and
   the following conditional expression being satisfied:

$0.27 \leq Ds/D \leq 0.8$ where Ds denotes an air space along the optical axis between the most image side lens surface of the front lens group and the most object side lens surface of the rear lens group, and D denotes a distance along the optical axis between the most object side lens surface and the most image side lens surface of the second lens group.

2. The zoom lens system according to claim 1, wherein the following conditional expression is satisfied:

$$0.5 \leq fb/fa \leq 15$$

where fa denotes the focal length of the front lens group, and fb denotes the focal length of the rear lens group.

3. The zoom lens system according to claim 2, wherein the following conditional expression is satisfied:

$$0 < n_{an} - n_{ap} < 0.45$$

where $n_{ap}$ denotes refractive index of the positive lens of the cemented lens in the front lens group at d-line, and $n_{an}$ denotes refractive index of the negative lens of the cemented lens in the front lens group at d-line.

4. The zoom lens system according to claim 3, wherein the following conditional expression is satisfied:

$$0 < n_{bn} - n_{bp} < 0.45$$

where $n_{bn}$ denotes refractive index of the negative lens of the cemented lens in the rear lens group at d-line, and $n_{bP}$ denotes refractive index of the positive lens of the cemented lens in the rear lens group at d-line.

5. The zoom lens system according to claim 4, wherein an aperture stop for defining an f-number is arranged between the front lens group and the rear lens group.

6. The zoom lens system according to claim 5, wherein the following conditional expression is satisfied:

$$\nu_{1p} < 23.2$$

where $\nu_{1p}$ denotes Abbe number of the medium of the positive lens in the first lens group.

7. The zoom lens system according to claim 6, wherein the following conditional expression is satisfied:

$$1.790 < n_{1p}$$

where $n_{1p}$ denotes refractive index of the medium of the positive lens in the first lens group.

8. The zoom lens system according to claim 7, wherein the first lens group consists of, in order from the object, the negative lens and the positive lens; and wherein the positive lens has a convex surface facing to the object.

9. The zoom lens system according to claim 1, wherein the following conditional expression is satisfied:

$$0 < n_{an} - n_{ap} < 0.45$$

where $n_{ap}$ denotes refractive index of the positive lens of the cemented lens in the front lens group at d-line, and $n_{an}$ denotes refractive index of the negative lens of the cemented lens in the front lens group at d-line.

10. The zoom lens system according to claim 9, wherein the following conditional expression is satisfied:

$$0 < n_{bn} - n_{bp} < 0.45$$

where $n_{bn}$ denotes refractive index of the negative lens of the cemented lens in the rear lens group at d-line, and $n_{bP}$ denotes refractive index of the positive lens of the cemented lens in the rear lens group at d-line.

11. The zoom lens system according to claim 1, wherein the following conditional expression is satisfied:

$$0 n_{bn} - n_{bp} < 0.45$$

where $n_{bn}$ denotes refractive index of the negative lens of the cemented lens in the rear lens group at d-line, and $n_{bP}$ denotes refractive index of the positive lens of the cemented lens in the rear lens group at d-line.

12. The zoom lens system according to claim 1, wherein an aperture stop for defining an f-number is arranged between the front lens group and the rear lens group.

13. The zoom lens system according to claim 1, wherein the following conditional expression is satisfied:

$$\nu_{1p} < 23.2$$

where $\nu_{1p}$ denotes Abbe number of the medium of the positive lens in the first lens group.

14. The zoom lens system according to claim 13, wherein the following conditional expression is satisfied:

$$1.790 < n_{1p}$$

where $n_{1p}$ denotes refractive index of the medium of the positive lens in the first lens group.

15. The zoom lens system according to claim 1, wherein the following conditional expression is satisfied:

$$1.790 < n_{1p}$$

where $n_{1p}$ denotes refractive index of the medium of the positive lens in the first lens group.

16. The zoom lens system according to claim 1, wherein the first lens group consists of, in order from the object, the negative lens and the positive lens; and wherein the positive lens has a convex surface facing to the object.

17. A zoom lens system comprising, in order from an object:
a first lens group having negative refractive power; and
a second lens group having positive refractive power;
zooming being carried out by varying an air space between the first lens group and the second lens group;
the first lens group including, in order from the object, a negative lens and a positive lens;
the second lens group including, in order from the object, a front lens group, and a rear lens group having positive refractive power;
the front lens group including, in order from the object, a positive lens and a cemented lens constructed by a positive lens cemented with a negative lens;
the rear lens group including, in order from the object, a cemented lens constructed by a negative lens cemented with a positive lens; and
the following conditional expression being satisfied:

$$\nu_{1p} < 23.2$$

where $\nu_{1p}$ denotes Abbe number of the medium of the positive lens in the first lens group.

18. The zoom lens system according to claim 17, wherein the first lens group consists of, in order from the object, the negative lens and the positive lens; and wherein the positive lens has a convex surface facing to the object.

19. The zoom lens system according to claim 18, wherein an aperture stop for defining an f-number is arranged between the front lens group and the rear lens group.

20. A zoom lens system comprising, in order from an object:
a first lens group having negative refractive power; and
a second lens group having positive refractive power;
zooming being carried out by varying an air space between the first lens group and the second lens group;
the first lens group consisting of, in order from the object, a negative lens and a positive lens having a convex surface facing to the object;
the second lens group including, in order from the object, a positive lens, a first cemented lens constructed by a positive lens cemented with a negative lens, an aperture stop and a second cemented lens constructed by a negative lens cemented with a positive lens.

21. The zoom lens system according to claim 1, wherein the second lens group including an aperture stop for defining an f-number arranged in the front lens group or adjacent to the object side of the front lens group.

22. The zoom lens system according to claim 21, wherein the following conditional expression is satisfied:

$$0.5 \leq fb/fa \leq 15$$

where fa denotes the focal length of the front lens group, and fb denotes the focal length of the rear lens group.

23. The zoom lens system according to claim 21, wherein the following conditional expression is satisfied:

$$0 < n_{an} - n_{ap} < 0.45$$

where $n_{ap}$ denotes refractive index of the positive lens of the cemented lens in the front lens group at d-line, and $n_{an}$ denotes refractive index of the negative lens of the cemented lens in the front lens group at d-line.

24. The zoom lens system according to claim 21, wherein the following conditional expression is satisfied:

$$0 < n_{bn} - n_{bp} < 0.45$$

where $n_{bp}$ denotes refractive index of the negative lens of the cemented lens in the rear lens group at d-line, and $n_{bn}$ denotes refractive index of the positive lens of the cemented lens in the rear lens group at d-line.

25. The zoom lens system according to claim 21, wherein the following conditional expression is satisfied:

$$\nu_{1p} < 23.2$$

where $\nu_{1p}$ denotes Abbe number of the medium of the positive lens in the first lens group.

26. The zoom lens system according to claim 21, wherein the following conditional expression is satisfied:

$$1.790 < n_{1p}$$

where $n_{1p}$ denotes refractive index of the medium of the positive lens in the first lens group.

27. The zoom lens system according to claim 21, wherein the first lens group consists of, in order from the object, the negative lens and the positive lens; and wherein the positive lens has a convex surface facing to the object.

28. A zoom lens system comprising, in order from an object:
   a first lens group having negative refractive power; and
   a second lens group having positive refractive power;
   zooming being carried out by varying an air space between the first lens group and the second lens group;
   the first lens group consisting of, in order from the object, a negative lens and a positive lens having a convex surface facing to the object;
   the second lens group including, in order from the object, a positive lens, a first cemented lens constructed by a positive lens cemented with a negative lens, and a second cemented lens constructed by a negative lens cemented with a positive lens, and
   an aperture stop being arranged in the second lens group or adjacent to the object side of the second lens group.

29. A method for forming an image of an object and varying a total focal length, comprising:
   providing a lens system that includes, in order from the object, a first lens group having negative refractive power and a second lens group having positive refractive power, the second lens group including, in order from the object, a front lens group having positive refractive power and a rear lens group having positive refractive power; and
   varying the total focal length of the lens system by changing an air space between the first lens group and the second lens group,
   wherein the following conditional expression is satisfied:

$$0.27 \leq Ds/D \leq 0.8$$

where Ds denotes an air space along the optical axis between the most image side lens surface of the front lens group and the most object side lens surface of the rear lens group, and D denotes a distance along the optical axis between the most object side lens surface and the most image side lens surface of the second lens group.

30. The method according to claim 29,
   wherein the first lens group includes, in order from the object, a negative lens and a positive lens;
   the front lens group includes, in order from the object, a positive lens and a cemented lens constructed by a positive lens cemented with a negative lens; and
   the rear lens group includes, in order from the object, a cemented lens constructed by a negative lens cemented with a positive lens.

31. The method according to claim 29,
   wherein the second lens group includes an aperture stop for defining an f-number arranged in the front lens group or adjacent to the object side of the front lens group.

32. A method for forming an image of an object and varying a total focal length, comprising:
   providing a lens system that includes, in order from the object, a first lens group having negative refractive power, and a second lens group having positive refractive power, the second lens group including, in order from the object, a front lens group, and a rear lens group having positive refractive power; and
   varying the total focal length of the lens system by changing an air space between the first lens group and the second lens group,
   wherein the following conditional expression is satisfied:

$$\nu_{1p} < 23.2$$

where $\nu_{1p}$ denotes Abbe number of the medium of the positive lens in the first lens group.

* * * * *